(12) United States Patent
Austin

(10) Patent No.: US 6,701,315 B1
(45) Date of Patent: *Mar. 2, 2004

(54) SYSTEMS, METHODS, AND COMPUTER PROGRAM PRODUCTS FOR DELIVERING INFORMATION IN A PREFERRED MEDIUM

(75) Inventor: Pamela Sue Austin, Cary, NC (US)

(73) Assignee: Bell & Howell Mail and Messaging Technologies Company, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,978

(22) Filed: Jun. 20, 2000

Related U.S. Application Data

(63) Continuation of application No. 08/966,183, filed on Nov. 7, 1997, now Pat. No. 6,157,924.

(51) Int. Cl.7 .............................................. G06F 17/30
(52) U.S. Cl. .................. 707/10; 707/103 R; 707/104.1; 455/415; 379/88.25
(58) Field of Search ........................ 707/10, 100, 104.1, 707/200, 201, 103 R; 709/239; 715/501.1, 507, 513; 379/88.19, 88.22, 88.25; 455/412.1, 414.4, 415

(56) References Cited

U.S. PATENT DOCUMENTS

| | | |
|---|---|---|
| 4,907,161 A | 3/1990 | Sansone et al. |
| 4,908,850 A | 3/1990 | Masson et al. |
| 4,941,091 A | 7/1990 | Breault et al. |

(List continued on next page.)

FOREIGN PATENT DOCUMENTS

| | | |
|---|---|---|
| CA | 2222967 | 11/1997 |
| EP | 0371607 A2 | 6/1990 |
| EP | 0383774 A2 | 4/1998 |
| EP | 0838774 A2 | 4/1998 |
| EP | 98121144 | 11/1998 |
| EP | 98121145 | 11/1998 |
| EP | 0917075 A2 | 5/1999 |
| EP | 0917076a2 | 5/1999 |
| EP | 1080946 A2 | 3/2001 |
| GB | 2 305 090 | 3/1997 |

OTHER PUBLICATIONS

Miller et al., "Accessing Messages Your Way," AT&T Technology 10, spring, No. 1, New York (1995).
"Methodology for Mail Delivery in a Multi–Media Environment," IBM Technical Disclosure Bulletin, vol. 36, No. 04, pp. 507–508 (Apr. 1993).
"Workstation Communications System," IBM Technical Disclosure Bulletin, vol. 37, No. 09, pp. 101–104 (Sep. 1994).
Fichera et al., "Internet Commerce: Trends and Directions & Universal Database Servers and the Web," Giga Briefings, Giga Information Group, North Carolina—Briefing (Aug. 1997).
Austin, "Alternative Messaging: Mail Gets Routed in a Whole New Direction, Part I," Mail Magazine, (Oct. 1997).
Austin. "Alternative Messaging: Who's Taking the Lead? Part II," Mail Magazine, (Nov. 1997).
Brochure, *Digital Document Delivery More Delivery Channels=Better Communications*, Pitney Bowes (1998.

*Primary Examiner*—Shahid Al Alam
(74) *Attorney, Agent, or Firm*—McDermott, Will & Emery

(57) ABSTRACT

Methods, systems and computer program products for delivering information to a user in one or more preferred delivery media are provided. Preferred delivery media includes, but is not limited to, e-mail, HTML, fax, printed copy, and mail. A user profile, indicating a user's preferred delivery medium (or media), is retrievably stored. When a user requests information, the user's profile is searched to determine the preferred delivery medium (or media) within which to deliver the requested information to the user. The requested information is retrieved, formatted for the preferred delivery medium, and then delivered to the user in the preferred medium. If the information is delivered to a user in multiple media, a consistent format among the various delivery media is maintained. The integrity of information delivered to a user is also verifiable, regardless of the delivery medium.

61 Claims, 17 Drawing Sheets

U.S. PATENT DOCUMENTS

| | | | | |
|---|---|---|---|---|
| 5,142,662 | A | 8/1992 | Gump et al. | |
| 5,187,787 | A | 2/1993 | Skeen et al. | |
| 5,220,501 | A | 6/1993 | Lawlor et al. | |
| 5,280,531 | A | 1/1994 | Hunter | |
| 5,283,829 | A | 2/1994 | Anderson | |
| 5,381,527 | A | 1/1995 | Inniss et al. | |
| 5,383,113 | A | 1/1995 | Kight et al. | |
| 5,465,206 | A | 11/1995 | Hilt et al. | |
| 5,479,411 | A | 12/1995 | Klein | 370/100.01 |
| 5,483,445 | A | 1/1996 | Pickering | |
| 5,493,692 | A | 2/1996 | Theimer et al. | |
| 5,496,991 | A | 3/1996 | Delfer, III et al. | 235/379 |
| 5,508,817 | A | 4/1996 | Kunigami | |
| 5,509,071 | A | 4/1996 | Petrie, Jr. et al. | 380/4 |
| 5,513,126 | A | 4/1996 | Harkins et al. | 709/228 |
| 5,557,518 | A | 9/1996 | Rosen | 705/69 |
| 5,579,087 | A | 11/1996 | Salgado | |
| 5,608,786 | A | 3/1997 | Gordon | |
| 5,621,797 | A | 4/1997 | Rosen | 380/24 |
| 5,627,764 | A | 5/1997 | Schutzman et al. | |
| 5,629,980 | A | 5/1997 | Stefik et al. | 380/4 |
| 5,629,982 | A | 5/1997 | Micali | 380/30 |
| 5,630,060 | A | 5/1997 | Tang et al. | 709/238 |
| 5,634,012 | A | 5/1997 | Stefik et al. | 705/39 |
| 5,638,443 | A | 6/1997 | Stefik et al. | 380/4 |
| 5,642,419 | A | 6/1997 | Rosen | 380/23 |
| 5,657,461 | A | 8/1997 | Harkins et al. | 345/733 |
| 5,659,481 | A | 8/1997 | Qutub et al. | 700/49 |
| 5,666,420 | A | 9/1997 | Micali | 380/30 |
| 5,671,280 | A | 9/1997 | Rosen | 380/24 |
| 5,675,507 | A | 10/1997 | Bobo, II | |
| 5,684,965 | A | 11/1997 | Pickering | |
| 5,694,551 | A | 12/1997 | Doyle et al. | |
| 5,696,906 | A | 12/1997 | Peters et al. | |
| 5,699,528 | A | 12/1997 | Hogan | 709/40 |
| 5,703,949 | A | 12/1997 | Rosen | 705/21 |
| 5,715,314 | A | 2/1998 | Payne et al. | 380/24 |
| 5,715,403 | A | 2/1998 | Stefik | 705/44 |
| 5,724,424 | A | 3/1998 | Gifford | 380/24 |
| 5,737,395 | A | 4/1998 | Irribarren | 379/88 |
| 5,742,668 | A | 4/1998 | Pepe et al. | 379/58 |
| 5,745,886 | A | 4/1998 | Rosen | 705/39 |
| 5,761,650 | A | 6/1998 | Munsil et al. | |
| 5,790,790 | A | 8/1998 | Smith et al. | |
| 5,794,221 | A | 8/1998 | Egendorf | 705/40 |
| 5,802,497 | A | 9/1998 | Manasse | 705/40 |
| 5,802,498 | A | 9/1998 | Comesanas | |
| 5,809,144 | A | 9/1998 | Sirbu et al. | 380/25 |
| 5,812,670 | A | 9/1998 | Micali | 380/25 |
| 5,815,665 | A | 9/1998 | Teper et al. | 709/229 |
| 5,825,865 | A | 10/1998 | Oberlander et al. | |
| 5,825,881 | A | 10/1998 | Colvin, Sr. | 380/24 |
| 5,832,460 | A | 11/1998 | Bednar et al. | 705/27 |
| 5,848,415 | A | 12/1998 | Guck | 707/10 |
| 5,850,520 | A | 12/1998 | Griebenow et al. | 709/206 |
| 5,862,325 | A | 1/1999 | Reed et al. | 709/201 |
| 5,870,089 | A | 2/1999 | Fabbio et al. | |
| 5,872,926 | A | 2/1999 | Levac et al. | |
| 5,873,075 | A | 2/1999 | Bresnan et al. | |
| 5,878,139 | A | 3/1999 | Rosen | 380/24 |
| 5,878,337 | A | 3/1999 | Joao et al. | 455/406 |
| 5,884,032 | A | 3/1999 | Bateman et al. | 709/204 |
| 5,884,284 | A | 3/1999 | Peters et al. | |
| 5,884,288 | A | 3/1999 | Chang et al. | 705/40 |
| 5,899,980 | A | 5/1999 | Wilf et al. | 705/26 |
| 5,903,830 | A | 5/1999 | Joao et al. | 455/406 |
| 5,918,220 | A | 6/1999 | Sansone et al. | 705/408 |
| 5,940,806 | A | 8/1999 | Danial | 705/26 |
| 5,956,693 | A | 9/1999 | Geerlings | |
| 5,963,925 | A | 10/1999 | Kolling et al. | |
| 5,978,780 | A | 11/1999 | Watson | 705/40 |
| 6,031,625 | A | 2/2000 | Sherman et al. | 358/1.18 |
| 6,044,362 | A | 3/2000 | Neely | 705/34 |
| 6,052,674 | A | 4/2000 | Zervides et al. | 705/40 |
| 6,343,327 | B2 | 1/2002 | Daniels, Jr. et al. | 709/239 |
| 6,483,599 | B1 | 11/2002 | Woodman et al. | |
| 2001/0014164 | A1 | 8/2001 | Daniels et al. | |
| 2001/0049659 | A1 | 8/2001 | Daniels et al. | |

Statement Distribution Application

Name: Pat Bufford  Customer#: 100  SSN: 046-41-9999
Address: 25 Oak View Ln  City/State/Zip: South Windsor, CT 06106  E-mail: cfowles@bentans

Personal Information:

| | | | |
|---|---|---|---|
| Cust Number | 100 | SSN | 046-41-9999 |
| First Name | Pat | Sex | M  Age 29 |
| Last Name | Bufford | Marital Status | M |
| Address | 15 Oak View Ln | Income | 81050 |
| City | South Windsor | Total Assets | 93000 |
| State | CT  zip: 06106 | E-mail | kfowles@bentana.com |
| Home Phone | 860-265-4123 | Fax | 860-289-6347 |

[ Cancel ]  [ Apply ]

( Personal Information )  ( Retrieve Archive )  ( Schedule Statement )
        54a                       54b                    54c

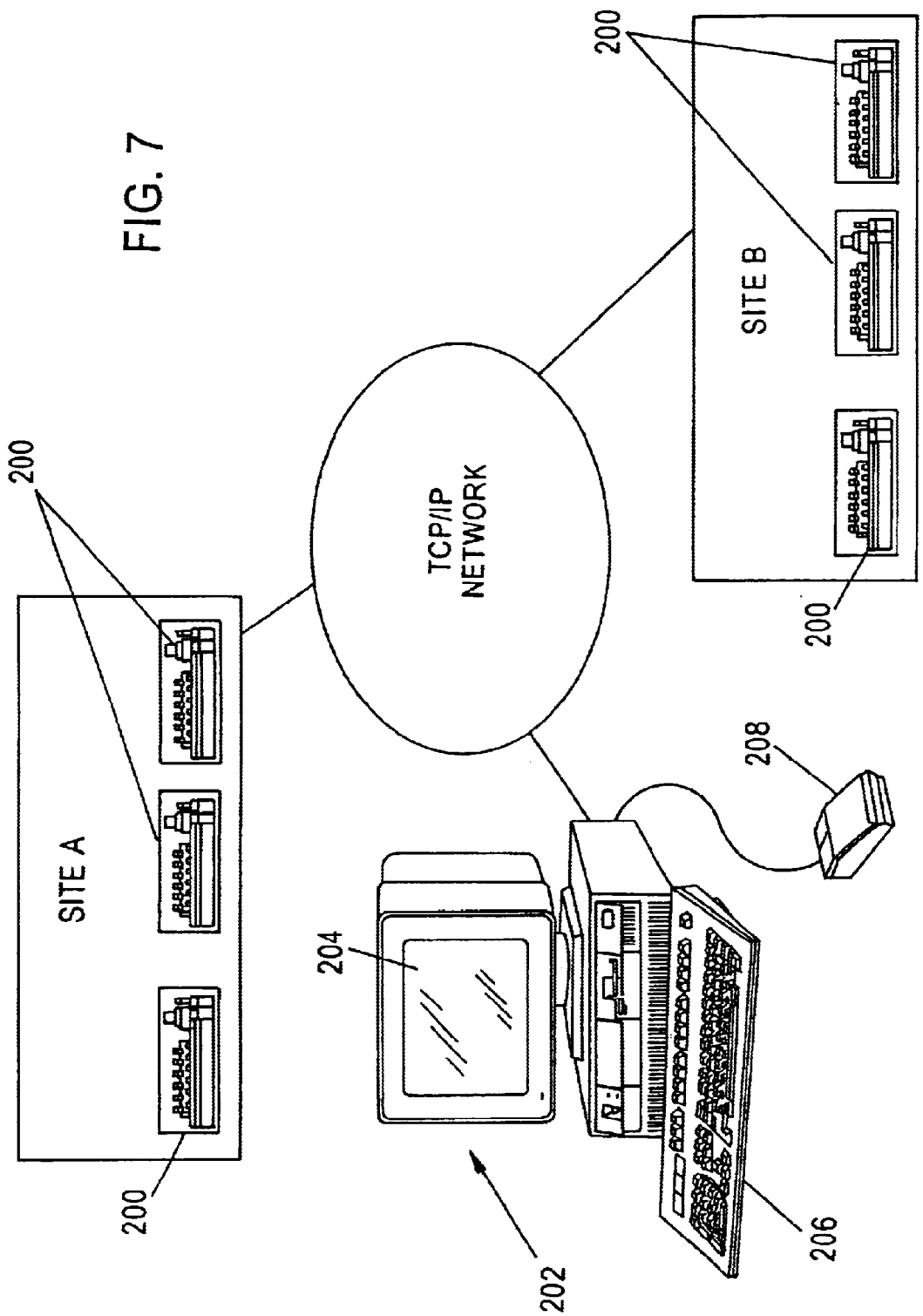

SYSTEMS, METHODS, AND COMPUTER PROGRAM PRODUCTS FOR DELIVERING INFORMATION IN A PREFERRED MEDIUM

This is a continuation of Ser. No. 08/966,183, filed Nov. 7, 1997, now U.S. Pat. No. 6,157,924

FIELD OF THE INVENTION

The present invention relates generally to data processing systems, methods, and computer program products, and more particularly to data processing systems, methods, and computer program products for delivering information.

BACKGROUND OF THE INVENTION

An important form of communication between businesses and customers has traditionally been "paper-based" communication, such as letters and bills mailed via a postal service. For example, it is estimated that merchants spend about $10 billion per year for printing and mailing of bills to customers. It is also estimated that banks account for about 6% of all first-class U.S. mail and that insurance companies and credit card companies account for about 4.5% and 4%, respectively.

However, significant interest has been expressed recently regarding alternative, non-paper methods of communication. The term "alternative messaging" refers to the distribution of information using alternative delivery media, including, but not limited to, facsimile transmissions (fax), electronic mail (e-mail), Internet, on-line banking, and the like. For example, in 1995, there were 550,000 on-line banking users performing about 45 million transactions. It has been estimated that these figures might grow to 3.9 million users conducting about 600 million transactions by the year 2000. The World Wide Web (hereinafter the "Web") has also become a popular medium for the exchange of information and for electronic commerce. Literally millions of new Web pages have been developed in the past several years as more and more individuals, businesses and organizations have discovered the power of Internet marketing. One reason for the Web's popularity is that it facilitates interactive communications between businesses and their customers.

Alternative messaging may also be more cost effective than traditional paper-based communications, such as mail, not only because of the higher cost of paper, printing and postage, but also because of the speed of electronic communications. Electronic financial transactions can occur almost instantaneously and have historically had fewer errors than comparable paper-based transactions. Additionally, error resolution time has been historically less than that for comparable paper-based transactions.

Unfortunately, alternative messaging has to date been met with resistance from both businesses and consumers for various reasons. Businesses have found it difficult to adapt legacy information systems to different delivery media with a consistent format. Additionally, many businesses may be reluctant to expend large amounts of money on upgrading existing communications infrastructures. Concern has also been expressed over the ability to ensure integrity of information transmitted via alternative messaging systems. "Mail-piece" integrity methods and systems are well established for traditional paper-based mail communications, but are virtually non-existent for non-paper communications. The term "mail-piece" generically refers to any single unit of communication (i.e., a piece of mail, an e-mail, fax, etc.).

Consumers have also shown a reluctance to embrace alternative messaging because of the perception that information transmitted via e-mail or over the Web is less secure than traditional paper-based mail. In addition, traditional mail-merge technologies may allow businesses to somewhat "personalize" communications with consumers via paper-based mail. Unfortunately, the extension of personalized communications to alternative messaging media may not achieve the same level of personalization as traditional paper-based mail.

SUMMARY OF THE INVENTION

It is therefore an object of the present invention to facilitate alternative messaging between businesses and their customers wherein a variety of delivery media can be utilized to communicate information.

It is another object of the present invention to facilitate interactive alternative messaging between businesses and their customers.

It is yet another object of the present invention to facilitate maintaining the integrity of information transmitted via alternative messaging systems.

It is also an object of the present invention to facilitate the provision of a consistent interface and/or presentation of information, regardless of the medium in which information is delivered.

It is yet another object of the present invention to promote personalized marketing and communications in alternative messaging systems.

These and other objects of the present invention are provided by methods, systems and computer program products for delivering information to a user in one or more preferred delivery media. When more than one delivery media is utilized, the present invention facilitates maintaining a consistent format among the various delivery media. A user profile, indicating a user's preferred delivery medium (or media), is retrievably stored, preferably within a data processing system. The user profile can be modified by the user or by the provider of information, or both. The user profile can also be updated automatically using information contained within the request for information. Preferred delivery media includes, but is not limited to: e-mail; browser-readable documents such as HyperText Markup Language (HTML) documents; fax; printed copy; and mail.

When a user request for information is received, the user's stored profile is searched to determine the preferred delivery medium (or media) within which to deliver the requested information to the user. Alternatively, a user may specify a preferred delivery medium in the request for information. Regardless of how the preferred delivery medium is determined, the requested information is then retrieved and formatted according to the preferred delivery medium. If the preferred delivery medium is e-mail, the retrieved information is formatted as an e-mail message and delivered to the user as an e-mail message. If the preferred delivery medium is HTML, the retrieved information is formatted as an HTML (or other browser readable) document and delivered to the user as an HTML document. If the preferred delivery medium is fax, the retrieved information is formatted as a fax document and "faxed" to the user. If the preferred delivery medium is printed copy, the retrieved information is formatted as a printed document and printed on a printer accessible by the user. If the preferred delivery medium is mail, the retrieved information is formatted as a paper document and mailed to the user.

Preferably, information formatted into an e-mail message or HTML document is delivered from a data processing system incorporating the present invention to a user data processing system in communication therewith. Preferably, information formatted into a fax document is delivered from a data processing system incorporating the present invention to a user facsimile machine in communication with the data processing system. Preferably, information formatted into a printed copy is delivered from a data processing system incorporating the present invention to a user printer in communication with the data processing system. Preferably, information formatted into mail is printed as a paper document and mailed to the user.

The present invention is particularly useful with mail inserting devices and systems. A data processing system incorporating the present invention can work in conjunction with a mail inserting device to print the retrieved information as a paper document, insert the printed document into an envelope, and deliver the envelope containing the printed document to a postal service for subsequent delivery to the user.

According to another aspect of the present invention, the integrity of information delivered to a user can be verified, regardless of the delivery medium. Integrity verification may include, but is not limited to, determining whether the information was delivered to the correct user, whether the correct information was delivered to the user, and whether all of the information was delivered to a user (i.e., whether all of the pages of a document were delivered). With respect to mail as a delivery medium, integrity verification may include ensuring that a paper document inserted into an envelope via an inserting device contains the requested information in its entirety and that it is formatted correctly. Furthermore, the present invention may work in conjunction with document printing systems upstream of mail inserting devices to insure that documents are streamed correctly towards the mail inserting devices.

According to another aspect of the present invention, additional, non-requested information may be included with the requested information in the preferred delivery medium. Exemplary additional information includes advertising and the like. Typically, the additional information is selected based on information contained within the user profile.

Preferably, encryption and other security techniques are incorporated into requests for information from a user and into the delivery of information to a user. For example, it is preferred that information is encrypted prior to its delivery to the user if the preferred delivery medium is e-mail or HTML.

The present invention can allow a customer to designate what type of delivery medium he/she is to receive information in. Furthermore, the present invention can ensure that the information delivered to a customer has a consistent presentation and format regardless of the delivery medium. The present invention can also allow information to be tailored to individual customers. Businesses can engage in "one-on-one" marketing with the efficiencies and cost-effectiveness of mass marketing.

BRIEF DESCRIPTION OF THE DRAWINGS

FIG. 4B is an exemplary "Personal Information" user interface, according to aspects of the present invention.

FIG. 4H illustrates information presented to a customer for a particular company in a format combining Web site information and news service information.

FIG. 7 a schematic diagram of a system for monitoring and controlling multiple mail processing systems, in accordance with the present invention

DETAILED DESCRIPTION OF THE INVENTION

Figure 1:
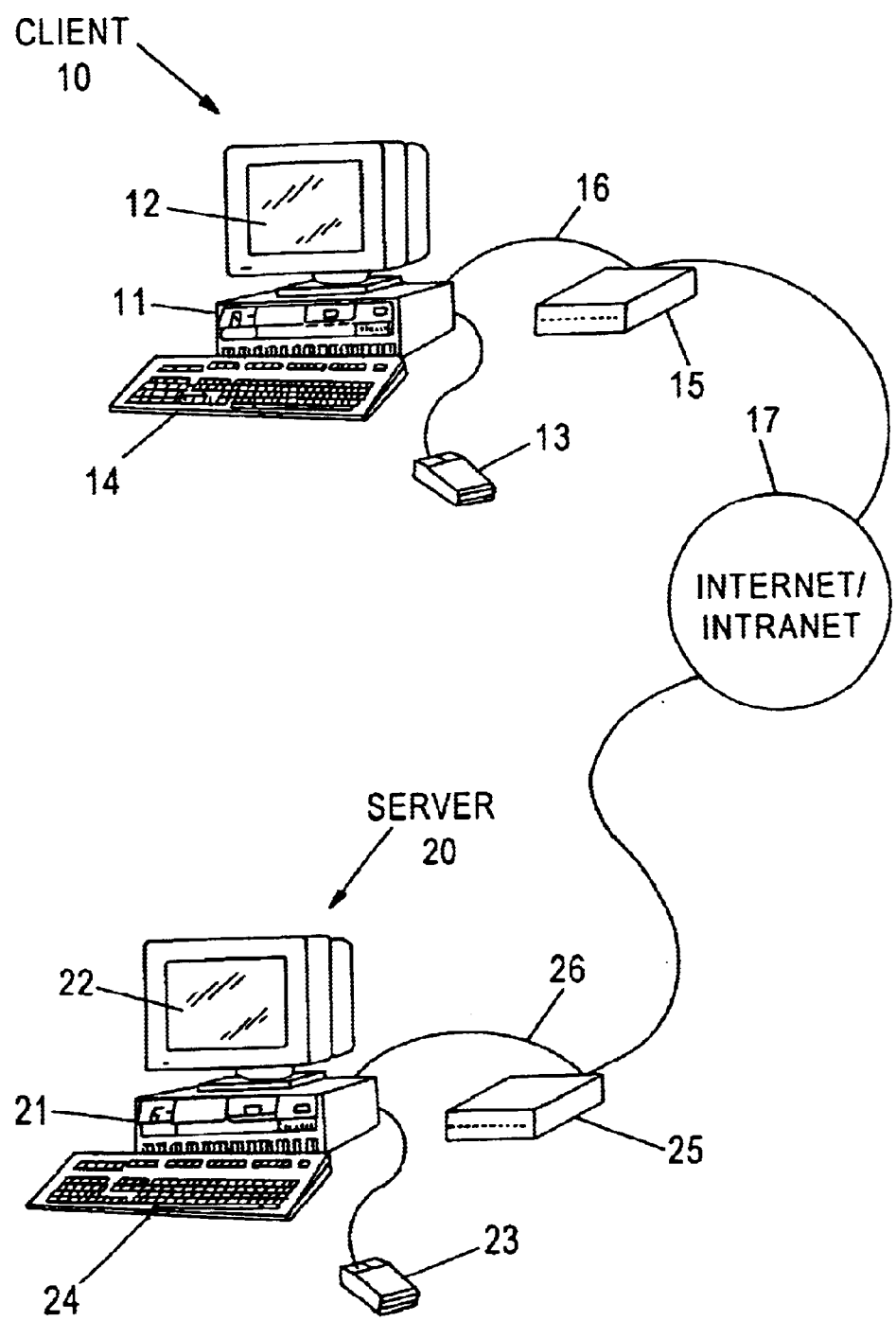
FIG. 1 schematically illustrates a client and server in communication via a computer network.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The present invention will now be described more fully hereinafter with reference to the accompanying drawings, in which preferred embodiments of the invention are shown. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The software for implementing the present invention comprises a plurality of modules, each controlling operations described in detail below. Preferably, each module comprises computer code written Java®. However, the present invention may be written in other object oriented programming languages such C++ and Smalltalk, and in other procedural programming languages such as BASIC, FORTRAN or COBOL. Preferably, the software runs on current standard Web server platforms such as, but not limited to, Windows 95®, Windows NT®, UNIX®, OS/2®, Sun Solaris®, and Apache. Portions of the software is designed to execute within the browser on the client. The present invention utilizes, in part, many standard features of current client-server and desk-top configurations, such as the ability to store data locally, connect to the Internet, and display visual information.

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The Internet

The Internet is a worldwide decentralized network of computers having the ability to communicate with each other. The Internet has gained broad recognition as a viable medium for communicating and interacting across multiple networks. The Web was created in the early 1990's, and is comprised of servers (computers connected to the Internet) having hypertext documents or Web pages stored therewithin. These Web pages are accessible by client devices (hereinafter "clients") using browser programs (hereinafter "browsers") utilizing the Hypertext Transfer Protocol (HTTP) and the Transmission Control Protocol/Internet Protocol (TCP/IP). Exemplary browsers include Netscape Navigator® (Netscape Communications Corporation, Mountain View, Calif.) and Internet Explorer® (Microsoft Corporation, Redmond, Wash.). Browsers typically provide a graphical user interface for retrieving and viewing Web pages hosted by HTTP servers.

A Web page, using a standard page description language known as HyperText Markup Language (HTML), typically displays text and graphics, and can play sound, animation, and video clips. HTML provides basic document formatting and allows a Web page developer to specify hypertext links (typically manifested as highlighted text) to other servers and files. When a user selects a particular hypertext link, the Web browser reads and interprets the address, called a URL (Uniform Resource Locator) associated with the link, connects the client with the Web server at that address, and makes a TCP/IP request for the Web page identified in the link. The server then sends the requested Web page to the client in HTML format which the browser interprets and displays to the user.

A URL gives the type of resource being accessed (e.g., Gopher, WAIS) and optionally the path of the file sought. For example: resource://host.domain/path/filename, wherein the resource can be "file", "http", "gopher", "WAIS", "news", or "telnet". Through the Web, users can access the various Internet services, including Gopher, Telnet, and FTP.

Client-Server Communications

Preferably, the present invention is carried out in a client/server communications environment where both customers and businesses communicate with servers via client machines. As is known to those with skill in the art, client-server environments may include public networks, such as the Internet, and private networks often referred to as "Intranets" and "Extranets." Hereinafter, all references to Web pages shall include Web pages residing on servers connected to the Internet and Web pages residing on servers connected to an Intranet and/or Extranet. Hereinafter, the term "Internet" shall incorporate the terms "Intranet" and "Extranet" and any references to accessing the Internet shall be understood to mean accessing an Intranet and/or and Extranet, as well. Hereinafter, the term "computer network" shall incorporate publicly accessible computer networks and private computer networks. The term "hypertext document" shall include Web pages residing within HTTP servers (also referred to as Web servers).

As illustrated in FIG. 1, users may access the Internet via a computer or terminal referred to as a client 10. Exemplary clients 10 may include, but are not limited to, an Apple®, Sun Microsystems®, IBM®, or IBM-compatible personal computer. A client 10 preferably includes a central processing unit 11, a display 12, a pointing device 13, a keyboard 14, access to persistent data storage, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP"). The Internet connection 16 may be made either by a direct connection of the client 10 to the Internet or indirectly via another device connected to the Internet. In the latter case, the client 10 is typically connected to this device via a local or wide area network (LAN or WAN). Preferably, data transfer rates between a client 10 and a server are equal to, or greater than, fourteen thousand four hundred baud (14,400 baud). However, lower data transfer rates are sometimes encountered.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server (described in detail below) to store various data transferred from the server.

Preferably, a client 10 has an Intel® Pentium® processor (or equivalent) with at least thirty-two megabytes (32 MB) of RAM, and at least five megabytes (5 MB) of persistent computer storage 15 for caching. However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network PC (Net PC) may be utilized in accordance with an embodiment of the present invention for accessing the Internet in a client capacity.

A user accesses a Web page by establishing a TCP connection between the client 10 and a server 20 (referred to hereinafter as a Web server) hosting the Web page. For the majority of Internet communications, a client communicates with a Web server using HTTP protocol over the TCP connection between the client and Web server. The data transferred between the client and the Web server are HTTP data objects (e.g. HTML data). A Web server may be a proxy that receives requests from a number of clients and routes the requests to the appropriate Web server. A Web server may also be referred to as an HTTP server.

A Web server 20 may have a configuration similar to that of a client 10 and may include a central processing unit 21, a display 22, a pointing device 23, a keyboard 24, access to persistent data storage 25, and an Internet connection 26 for connecting to the Internet 17 via a modem 25, or otherwise. It is preferable that a Web server have an Intel® Pentium® processor or equivalent, at least sixteen megabytes (32 MB) of RAM, and at least eight hundred megabytes (800 MB) of data storage. However, a Web server 20 may be implemented using other processors and via other computing devices, including, but not limited to, mainframe computing systems and minicomputers. Web server software handles requests from clients for documents, whether they are text, graphic, multimedia, or virtual. The Web server software may run under the operating system of the Web server.

Other types of servers, such as fax servers and mail servers, may be utilized by the present invention. As used throughout, the term "server" shall include all types of servers including Web, fax, mail, and the like, without limitation. As would be understood by those skilled in the art, fax servers, mail servers, and the like also typically include a central processing unit, a display, a pointing device, a keyboard, access to persistent data storage, and an Internet connection for connecting to the Internet. These servers may have configurations and requirements similar to those of Web servers. These servers may also be implemented using other processors and via other computing devices, including, but not limited to, mainframe computing systems and mini-computers.

Figure 2:
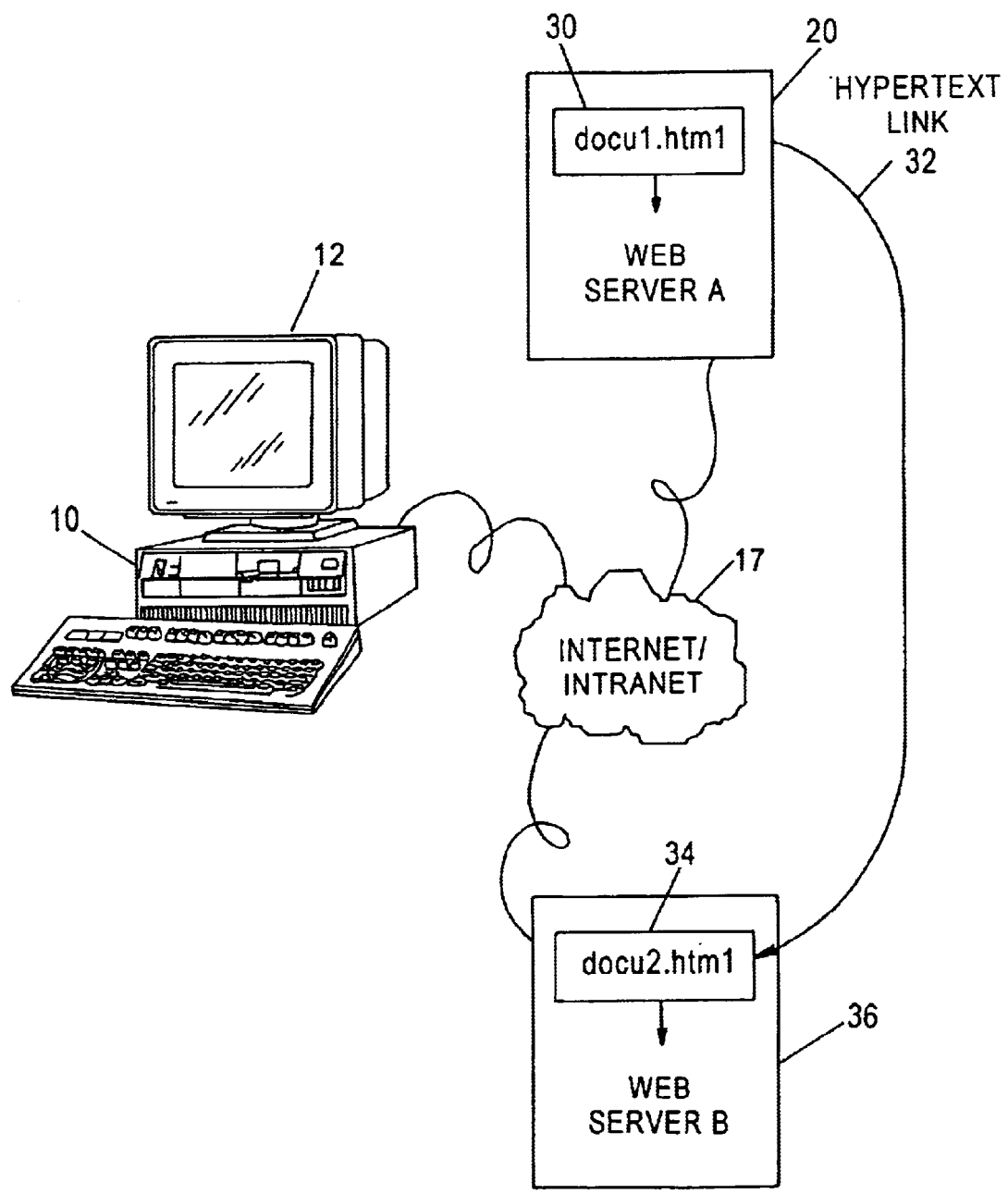
FIG. 2 schematically illustrates a client accessing a hypertext document, such as a Web page hosted by a Web server.

Referring now to FIG. 2, accessing a Web page hosted by a Web server is schematically illustrated. During a typical communication, a client 10, via a browser residing on the client, makes a TCP/IP request for a Web page 30 from the host Web server 20 and displays the Web page on the client display device 12. If the displayed Web page 30 contains a hypertext link 32, the user can activate that link, and the browser will retrieve the linked Web page 34 from its host Web server 36.

It is understood that a client or Web server, fax server, mail server or other apparatus configured to execute program code embodied within computer usable media, operates as means for performing the various functions and carries out the methods of the various operations of the present invention.

Java®

Preferably, the present invention is implemented in the Java® programming language. Java® is an object-oriented programming language developed by Sun Microsystems, Mountain View, Calif. Java® is a portable and architecturally neutral language. Java® source code is compiled into a machine-independent format that can be run on any machine with a Java® runtime system known as the Java Virtual Machine (JVM). The JVM is defined as an imaginary machine that is implemented by emulating a processor through the use of software on a real machine. Accordingly machines running under diverse operating systems, including UNIX, Windows NT®, and MacIntosh® having a JVM can execute the same Java® program.

Web browsers including Netscape Navigator® and Microsoft Internet Explorer® are referred to as Java-enabled browsers because they include a version of the JVM. Java® applets are programs written in Java®) and configured to run within Java-enabled browsers. Handled in a manner similar to the way images are handled, Java® applets are displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

Java® source code is compiled into bytecode using a Java® compiler referred to as a Javac. Compiled Java programs are saved in files with the extension ".class". When a Java-enabled Web browser recognizes that an applet has been requested, a Java® interpreter program runs the applet bytecode on the JVM. The Java® programming language and Java® applets are described in *Java in a Nutshell*, O'Reilly & Associates, Inc., 1996, Sebastopol, Calif., which is incorporated herein by reference in its entirety.

Java® applets are considered more powerful and flexible for creating interactive user interfaces than HTML forms and CGI script. Handled in a manner similar to the way images are handled, Java® applets are displayed as part of an HTML document. Typically, text within an HTML document flows around the space occupied by an applet. When an applet is loaded, it can present special effects, such as animation, graphics, sound, real-time data updates, applications and can interact with a user through the mouse, keyboard and various interface elements such as buttons, slides, and text fields.

As known to those having skill in the art, Java® applets are embedded within an HTML document via an applet tag (<applet>). This tag is used to describe the applet, its parameters, and its dimensions. When an applet tag is activated, the client's browser downloads the code for the applet from the specified Web server and then executes the applet on the client. As is known to those skilled in the art, applet activation may occur automatically upon the loading of an HTML page by the Web browser, by activating a link, or by other user actions. In contrast to CGI, wherein a program or script executes on the Web server, Java® applets execute on the client. As such, Java® applets typically offer greater user interaction and speed than is possible using CGI.

Alternative Messaging System

Figure 3:
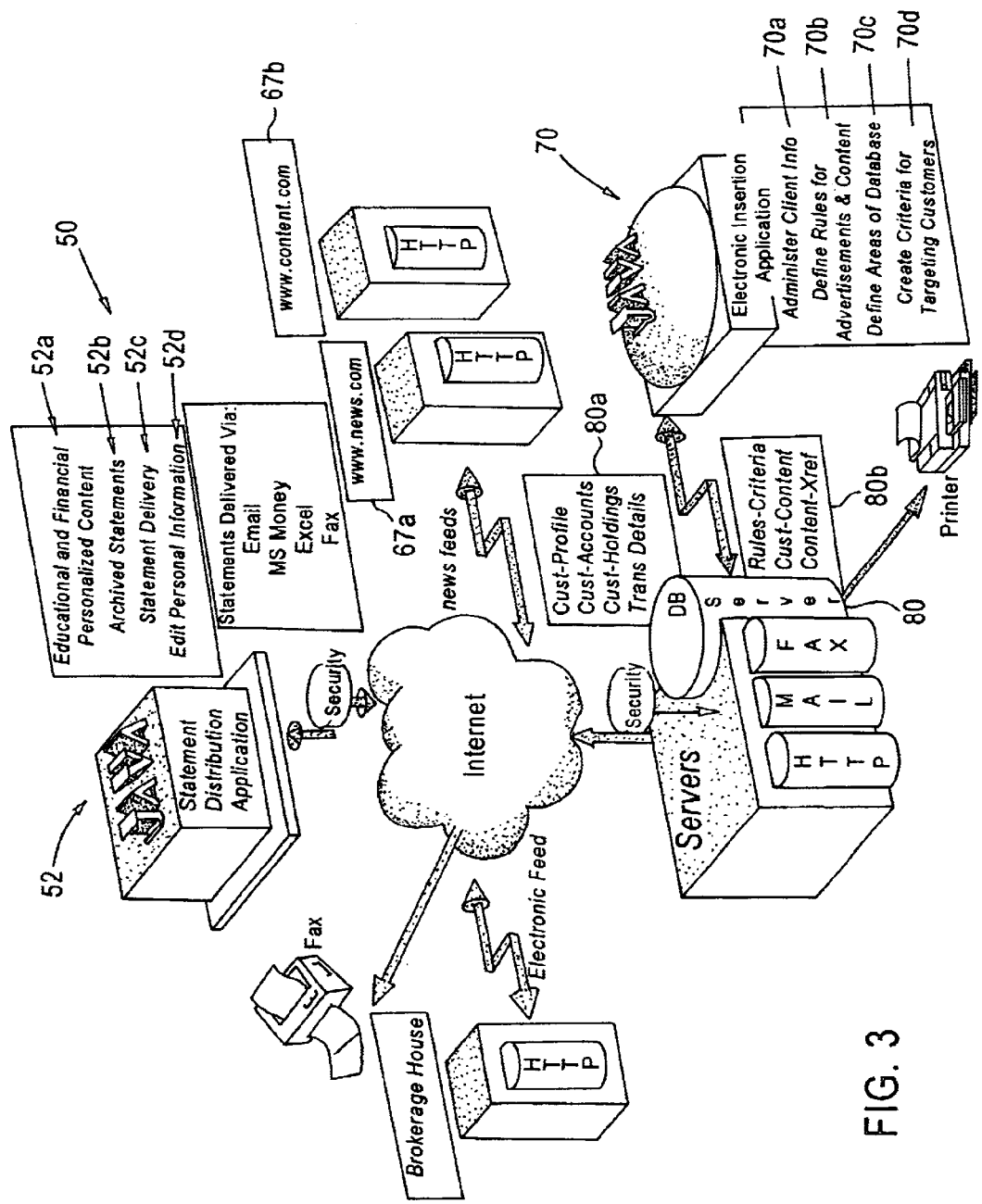
FIG. 3 is schematic illustration of an alternative messaging system, according to aspects of the present invention.

Referring now to FIG. 3 an alternative messaging system 50, according to aspects of the present invention, is schematically illustrated. The illustrated system can ensure that consistency of information presentation is provided regardless of the medium in which the information is delivered to a customer. The illustrated system 50 includes a Statement Distribution Application 52 and an Electronic Insertion Application 70. The illustrated alternative messaging system 50 relates to a mythical financial institution "Bank USA" and illustrates how alternative messaging can be implemented in a financial environment. It is understood, however, that the present invention is not limited to financial industry implementations. The present invention may be implemented wherever it is desired to provide alternative methods of communications between parties.

Statement Distribution Application

Figure 4A:
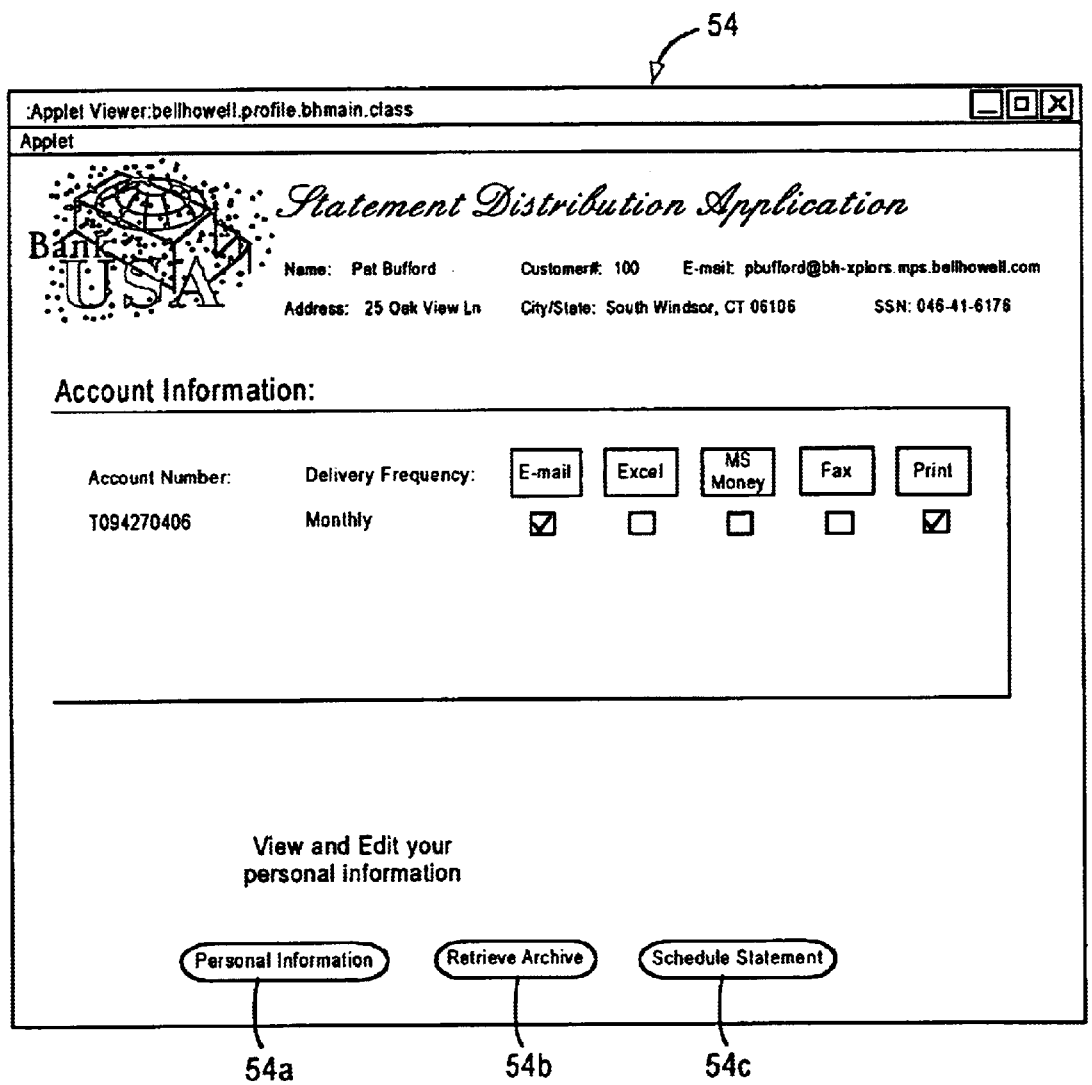
FIG. 4A is an exemplary interactive user interface for a customer utilizing a Statement Distribution Application, according to aspects of the present invention.

The illustrated Statement Distribution Application 52 includes the following components: educational and financial personalized content 52a; archived statements 52b; statement delivery 52c; and edit personal information 52d. An exemplary software product for carrying out operations of the Statement Distribution Application 52 is the Trans-Former™ print-image and data manipulation software from Bell & Howell Mail Processing Systems, P.O. Box 14986, Research Triangle Park, N.C. 27709-4986. An exemplary interactive user interface 54 for a customer utilizing the Statement Distribution Application 52 is illustrated in FIG. 4A.

Via the illustrated user interface 54 downloaded to a client machine, a customer may obtain access to his/her personal information via the "Personal Information" button 54a. By clicking the "Personal Information" button 54a, a customer obtains, via a server, access to one or more databases or files containing customer information. These databases and/or files may be dedicated to the alternative messaging system 50 or may be existing legacy information systems. In the illustrated embodiment, when a customer clicks on the "Personal Information" button 54a on his/her client machine, he/she obtains access to personal information via a "Personal Information" user interface 56, illustrated in FIG. 4B. Exemplary customer information available through the "Personal Information" user interface 56 includes, but is not limited to: customer number; customer name; customer address; customer phone and fax numbers; customer email address; customer social security number; customer sex and age; customer marital status; and various types of customer financial information. A customer is allowed to view his/her personal information via the Personal Information user interface 56 and add, modify or delete, as necessary. Because some businesses may not want customers to have direct access to various databases, including legacy information systems, the alternative messaging system 50 may include an application that routes personal information somewhere for review prior to actually updating existing databases.

Figure 4C:
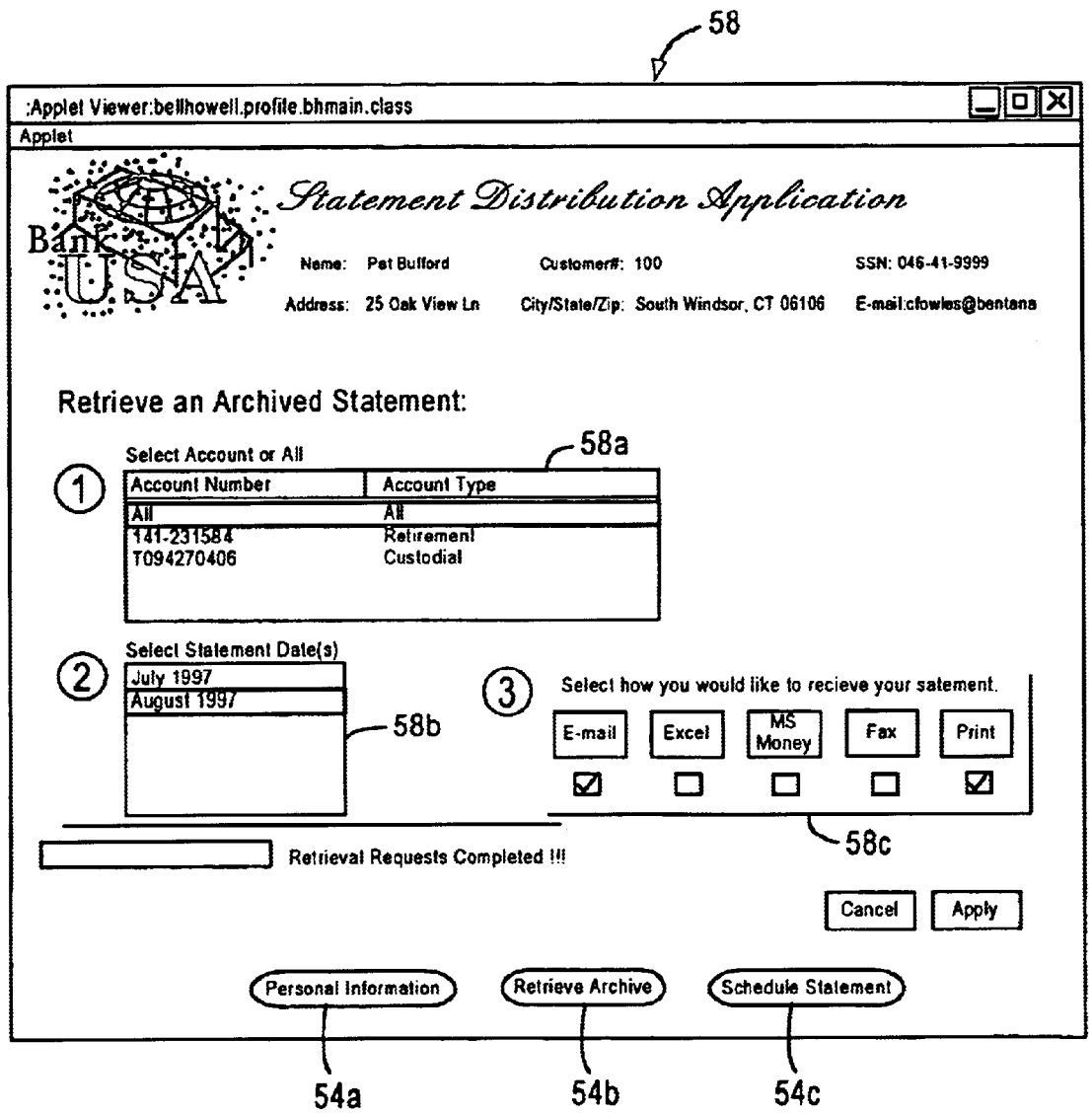
FIG. 4C is an exemplary "Retrieve an Archived Statement" user interface, according to aspects of the present invention.

Via the illustrated user interface 54 (FIG. 4A), a customer may obtain access to archived information about previous statements by clicking on the "Retrieve Archive" button 54b. When activated, the "Retrieve Archive" button 54b presents the customer with a "Retrieve an Archived Statement" user interface 58, illustrated in FIG. 4C. The illustrated "Retrieve an Archived Statement" user interface 58 allows a customer to select the accounts her/she wishes to obtain statements for 58a, the dates of those statements 58b, and what delivery medium (i.e., e-mail, Excel® spreadsheet, Microsoft MS Money®, fax, print) to receive the selected statements in.

Figure 4D:
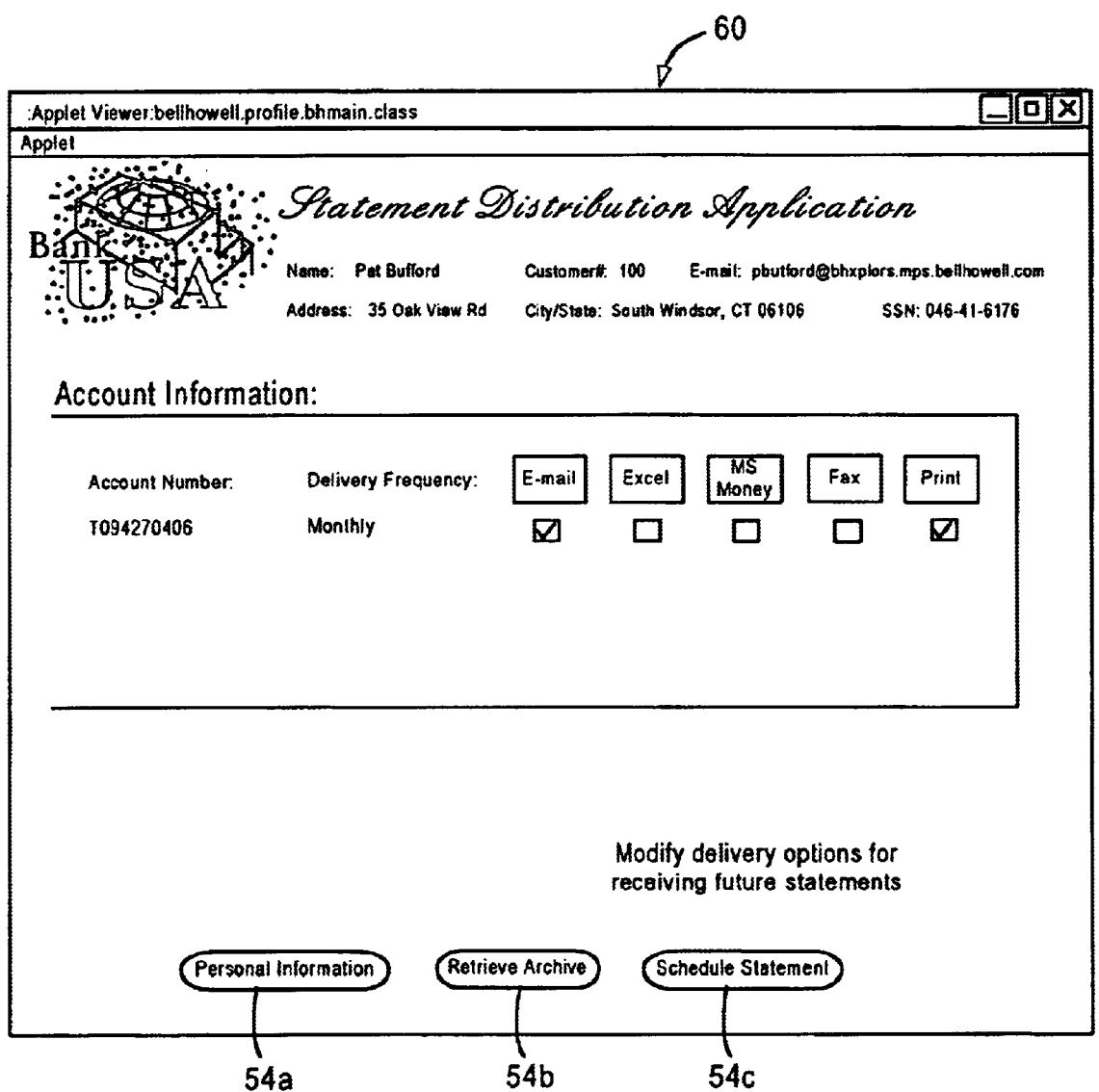
FIG. 4D is an exemplary "Account Information" user interface, according to aspects of the present invention.
Figure 4E:
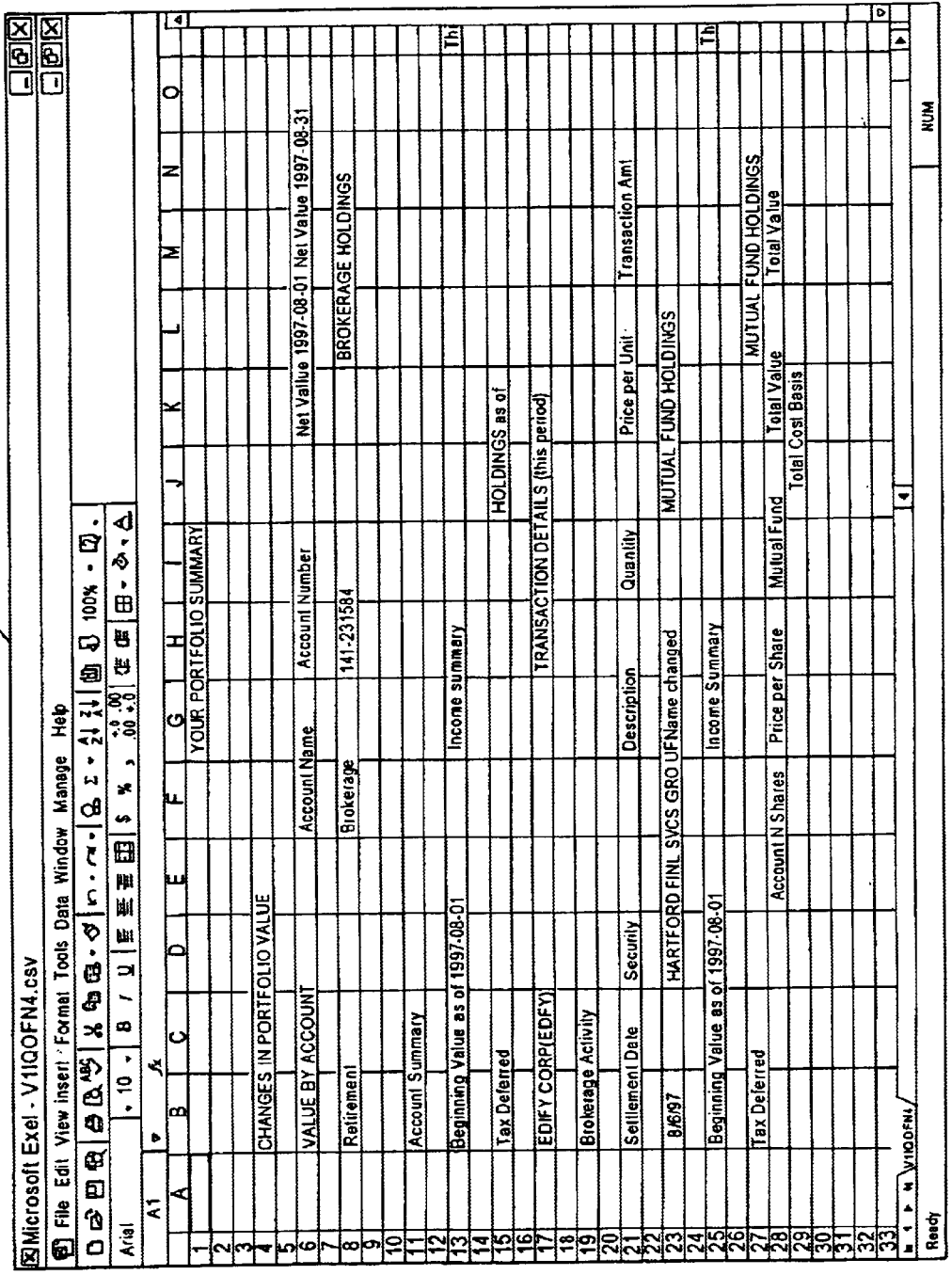
FIG. 4E is an exemplary statement transmitted to a customer in spreadsheet format, according to aspects of the present invention.
Figure 4F:
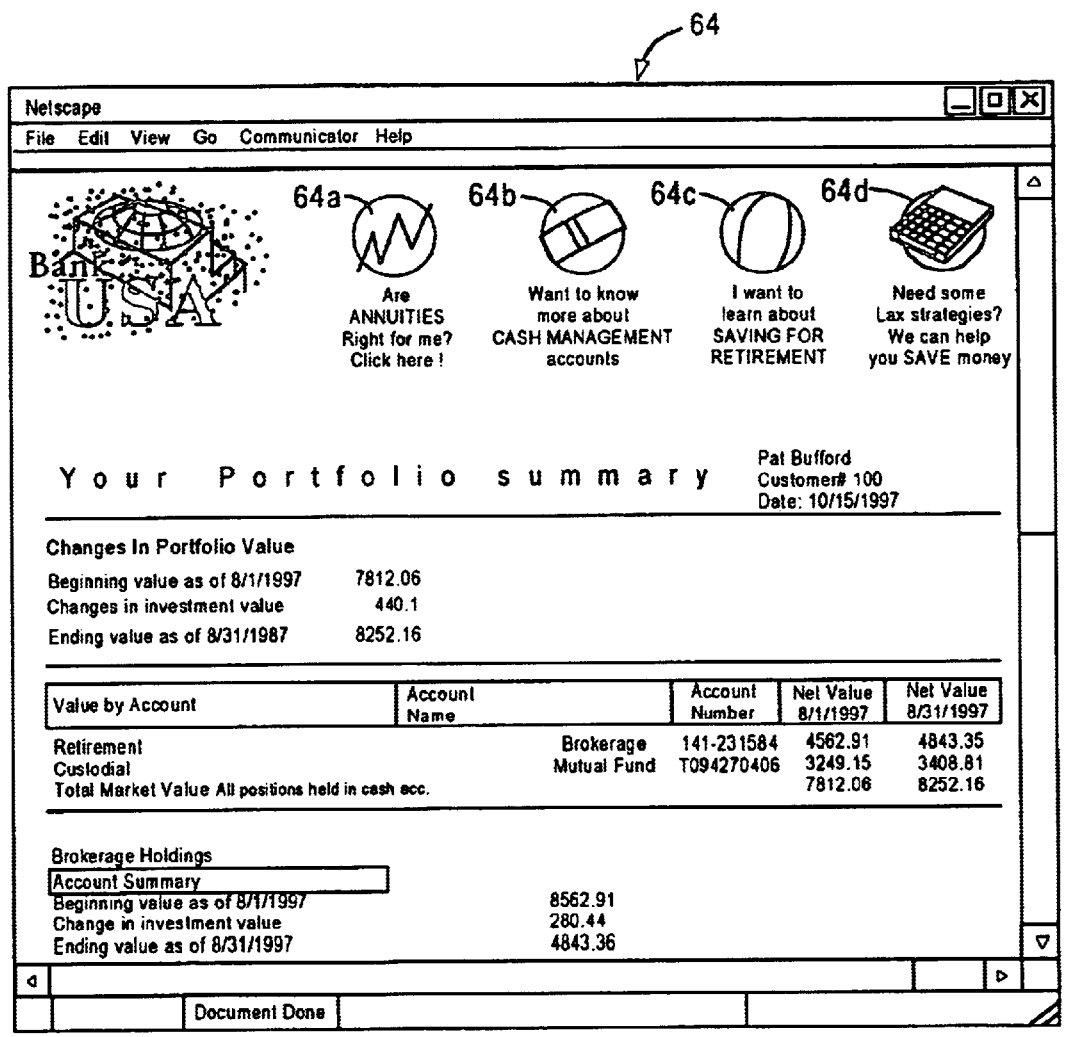
FIG. 4F is an exemplary statement transmitted to a customer in e-mail format, according to aspects of the present invention.

Via the illustrated user interface 54 (FIG. 4A), a customer may change the delivery medium of future statements by clicking the "Schedule Statement" button 54c. When activated, the "Schedule Statement" button 54c presents the customer with an "Account Information" user interface 60, illustrated in FIG. 4D. The illustrated "Account Information" user interface 60 allows a customer to select the delivery medium (i.e., e-mail, Excel® spreadsheet, Microsoft MS Money®, fax, print) in which to receive statements in. For example, if a customer elected to receive statements in Excel® spreadsheet format, the statements would appear as illustrated in FIG. 4E. If a customer elected to receive statements in e-mail format, the statements would appear as illustrated in FIG. 4F. Regardless of the delivery medium, the alternative messaging system 50, according to the present invention presents information to a customer in a consistent format. For example, both formats 62, 64 illustrated in FIGS. 4E and 4F respectively, present a customer with the following information: changes in portfolio value; value by account; brokerage holdings; and so forth.

FIG. 4F illustrates the format 64 of a statement delivered via e-mail to a customer. There are advertising buttons 64a, 64b, 64c, 64d across the top portion of the statement. The illustrated advertising buttons 64a, 64b, 64c, 64d are hypertext links to information contained within the same source that transmitted the e-mail to the customer, or to other Web sites. The present invention allows for businesses to present selected advertising based upon customer profiles. For example, a 75 year old customer with brokerage holdings in excess of $10 million may be presented with different advertisement options than a 40 year old customer with brokerage holdings valued at less than $10 thousand.

The present invention may also incorporate variations of "Push" technology, wherein a customer defines what types of information he/she would like to see when statements (or other messages) are transmitted thereto. Utilizing "Push" technology, an alternative messaging system according to the present invention may download information from one or more pre-defined sources automatically for distribution to customers desiring the particular type of downloaded information. For example, customized news could be delivered to customers with transmitted statements (or other messages).

Figure 4G:
FIG. 4G illustrates advertising information available to a customer from the e-mail statement illustrated in FIG. 4F.

In the illustrated e-mail format 64, if a customer clicks on the advertising button 64b for "Cash Management", the screen 66 illustrated in FIG. 4G is presented to the customer. In the illustrated advertisement on Cash Management, there are hyperlinks to additional information. The present invention allows businesses to track which customers look at the what information. Customer information can then be updated to more accurately reflect a particular customer's interests. By using historical tracking information, the present invention allows businesses to continually refine what types of advertisements and information appeal to each customer, thereby increasing marketing effectiveness and efficiency.

Figure 4H:
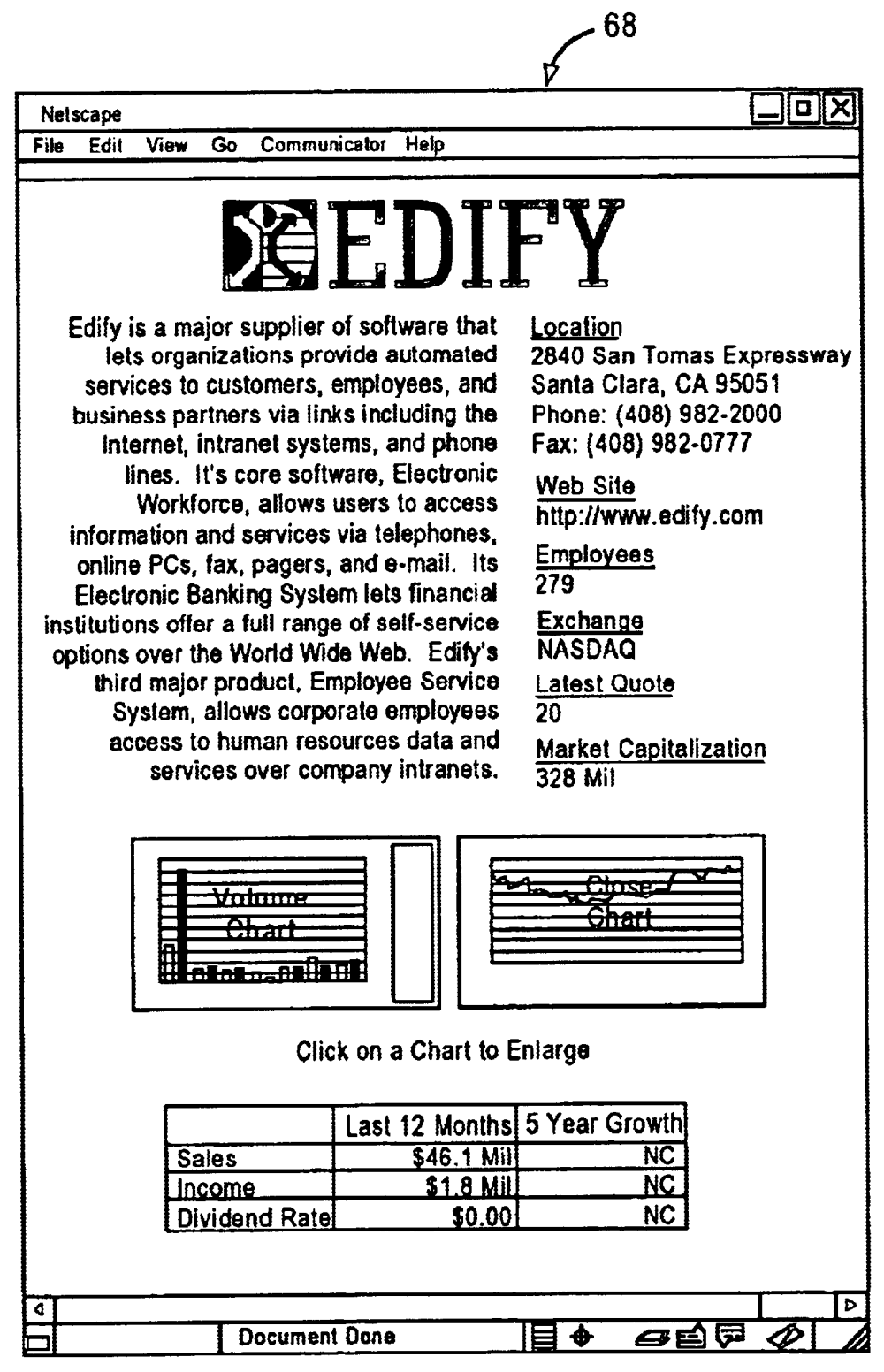

If a customer clicks on any of his/her holdings (i.e., companies in which customer holds equity) listed under "Brokerage Holdings", the present invention gathers and retrieves information about the particular company via customer-selected sources. For example, a customer could choose Reuters internet news service from which to gather the information. Alternatively, a customer could choose to gather information from the selected company's Web site. This is illustrated schematically in FIG. 3 where "www.news.com" 67a and "www.content.com" 67b refer to gathering information via news feeds and Web site content, respectively. FIG. 4H illustrates information presented to a customer for a particular company in a format 68 combining Web site information and news service information. Various hyperlinks may be provided within the illustrated format 68 to additional information, including, but not limited to real-time updates of various financial information.

Electronic Insertion Application

Figure 5:
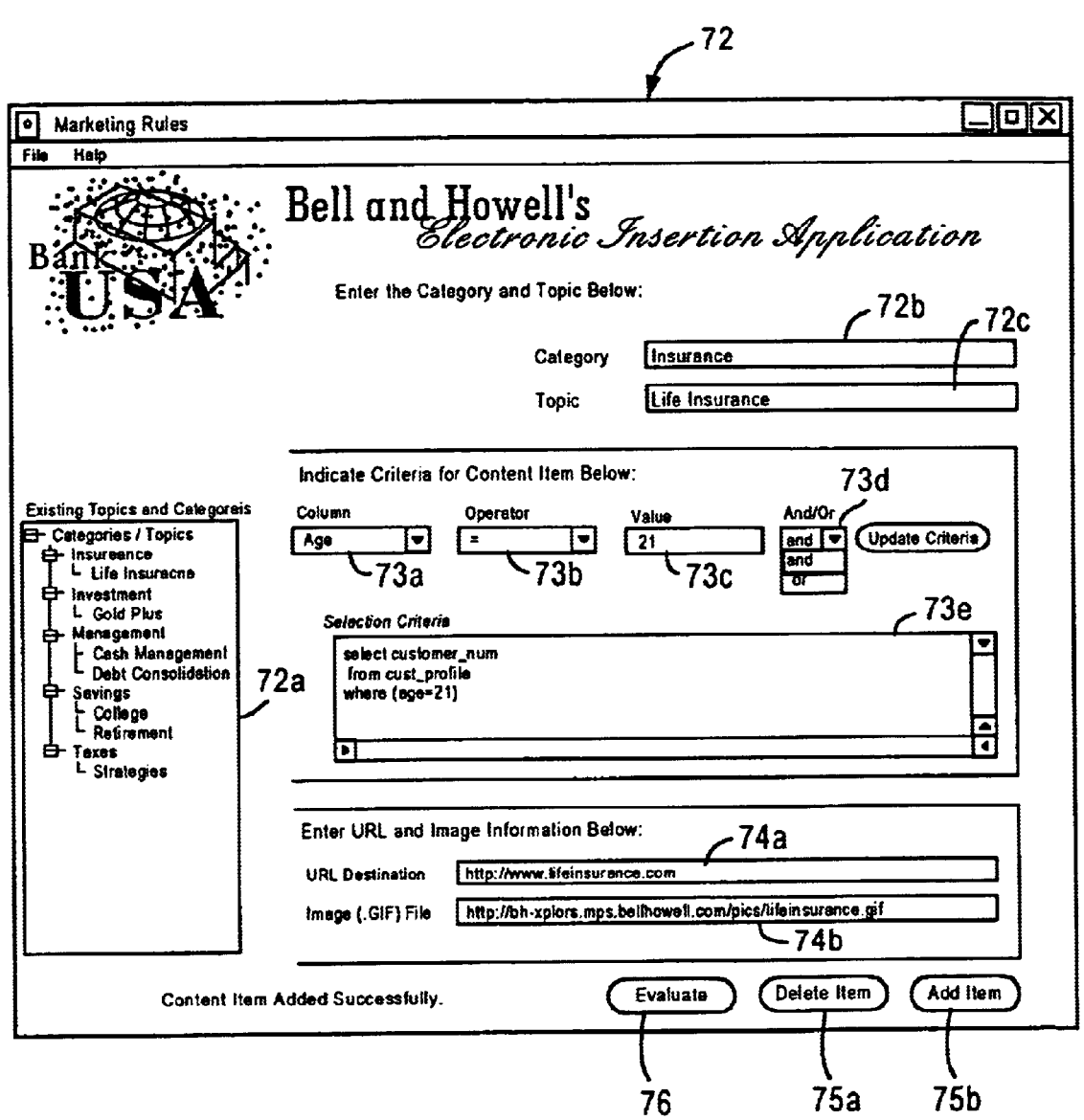
FIG. 5 is an exemplary interactive user interface for a business utilizing an Electronic Insertion Application, according to aspects of the present invention.

The illustrated Electronic Insertion Application 70 (FIG. 3) includes the following components: administer client information 70a; define rules for advertisements and content 70b; define areas of database 70c; and create criteria for targeting customers 70d. An exemplary interactive user interface 72 for a business utilizing the Electronic Insertion Application 70 is illustrated in FIG. 5. The illustrated user interface 72 contains a variety of selectable categories and topics within the "Existing Topics and Categories" window 72a. A business user can select topics and categories from window 72a and set various parameters therefor in the illustrated parameter windows 73a, 73b, 73c, 73d, 73e. In the illustrated user interface 72, "Insurance" is the selected category and "Life Insurance" is the selected topic, both of which are displayed in windows 72b, 72c, respectively.

Still referring to the user interface 72 of FIG. 5, the illustrated parameters set by a user indicate that all customers in a customer profile database who are older than 40 years of age are to receive an ad related to life insurance. As described above with respect to the statement distribution application 52, this ad will appear in whatever delivery medium a customer receives a statement or other information in from the business. The URL of the source of information, including related images, are indicated in display windows 74a, 74b. The illustrated user interface 72 also includes buttons 75a, 75b for adding and deleting topics/categories, respectively. When a topic/category is deleted, customers receiving statements no longer receive information relating to the deleted topic/category automatically. Conversely, when a topic/category is added, customers receiving statements are automatically eligible to receive information relating to the added topic/category.

Still referring to the illustrated user interface 72 of FIG. 5, an "Evaluate" button 76 is provided for determining which customers are to receive information on the selected topic/category based upon the indicated parameters. When activated, the "Evaluate" button 76 evaluates the various parameters set by a user in the various parameter windows 73a, 73b, 73c, 73d, 73e and then identifies customers who satisfy the criteria. In the illustrated user interface, the criteria "all customers over the age of 30" is satisfied by 9 out of 14 customers. Accordingly, these 9 customers will receive life insurance information in statements transmitted to them, regardless of the medium in which they receive the statements.

Data Storage

Referring back to FIG. 3, a database server 80 is utilized by the Statement Distribution Application 52 and the Electronic Insertion Application 70 described above. Continuing the Bank USA example above, the database server 80 could be maintained by the business (Bank USA) or by a third party. In the illustrated embodiment, the database server 80 is accessible to both customers of Bank USA and to Bank USA via the Internet. However, client/server communications according to the present invention are not limited to the illustrated embodiment. For example, the database server 80 may be accessible by Bank USA client machines via an internal Local Area Network (LAN). Furthermore, customer client machines may access the database server 80 via private or dedicated telephone lines.

Preferably, each business utilizing alternative messaging according to the present invention, maintains a database server 80 which contains customer information 80a and content delivery information 80b. Continuing the Bank USA example above, customer information 80a includes: customer profile information; customer account information; customer holdings information; and customer transaction information. Content delivery information includes: rules and criteria for delivering content to customers; actual content to deliver; and customer cross reference information. Exemplary databases for use within the database server 80 include, but are not limited to, Oracle, Sybase, and SQL Server.

Alternative Messaging Operations

Figure 6A:
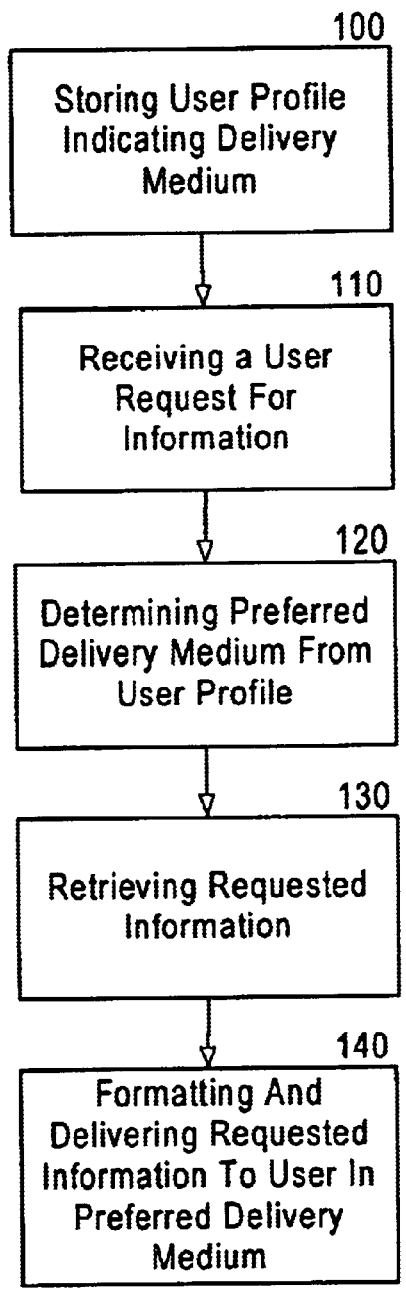
FIGS. 6A–6E are flowcharts schematically illustrating various operations of an alternative messaging system, according to aspects of the present invention.

Referring now to FIGS. 6A–6E, operations for carrying out various aspects of an alternative messaging system, according to the present invention, are schematically illustrated. Referring initially to FIG. 6A, operations include: storing a user profile containing an indication of a preferred delivery medium (Block 100); receiving a user request for information (Block 110); determining a preferred delivery medium from the user's profile (Block 120); retrieving the requested information (Block 130); and formatting and delivering the requested information to the user in a preferred delivery medium (Block 140).

Continuing the Bank USA example described above, a user profile is stored within one or more database servers. A user (customer) requests information from a business via the Statement Distribution Application 52 (FIG. 3). The Statement Distribution Application may update the user's profile to include additional information or to modify or delete existing information.

Figure 6B:
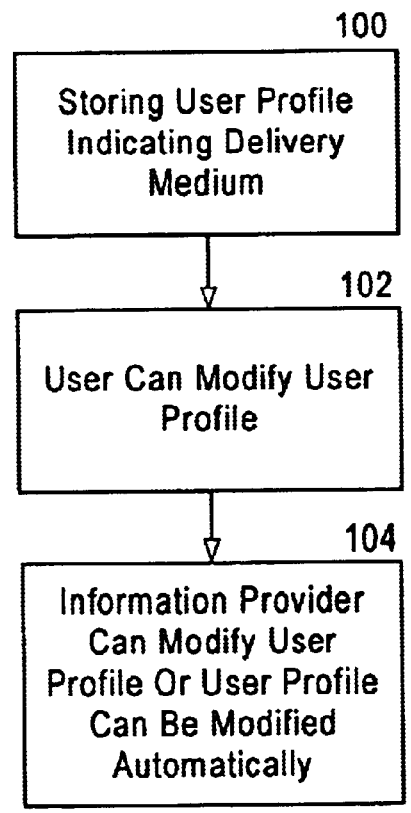

Referring now to FIG. 6B, a user may modify his/her user profile (Block 102). An information provider may also modify a user's profile and/or a user's profile may be modified automatically via information received via a user's requests (Block 104). The term "modify" includes adding data, changing existing data, and deleting data within a user profile. In the Bank USA example, a user (customer) may make additions, changes and/or deletions to his/her profile via the Statement Distribution Application.

Figure 6C:
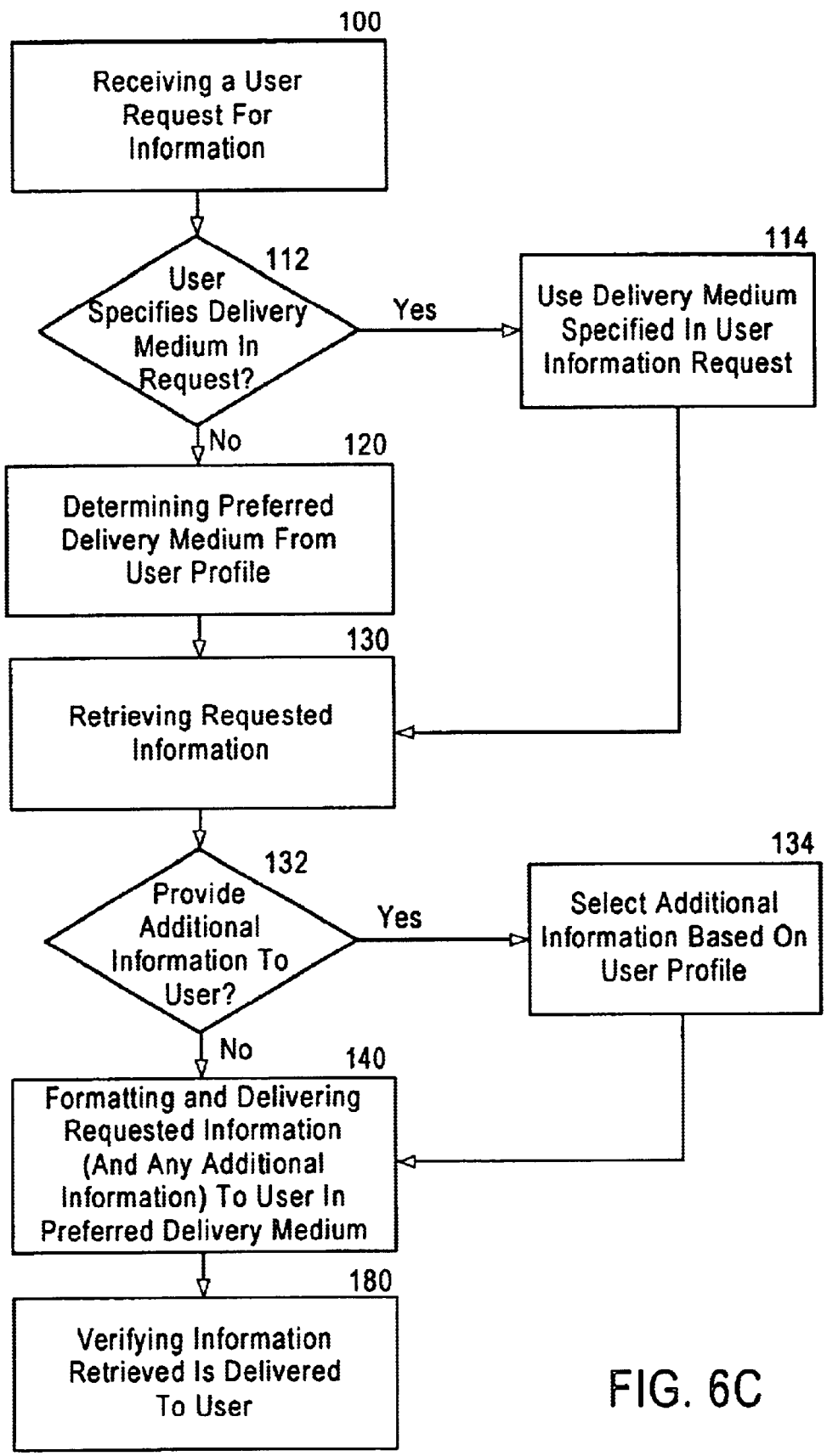

Referring now to FIG. 6C, a user may specify one or more delivery media with his/her request for information (Block 112). If a delivery medium is specified in a user request for information, the specified delivery medium is used (Block 114). If no specification as to delivery medium accompanies the information request, the user profile is searched to determine the user's preferred delivery medium (or media) (Block 120). In the Bank USA example, user profile searching (Block 120) is carried out via the Statement Distribution Application which searches the user profile located within the database server. The requested information is then retrieved (Block 130). The step of retrieving the requested information may occur prior to, simultaneously with, or after a user profile is searched, and is not limited to the illustrated embodiment. In the Bank USA example, the requested information is retrieved (Block 130) via the Electronic Insertion Application.

Still referring to FIG. 6C, a determination is made whether to include additional information with the requested information (Block 132). As described above, additional information may include advertising selected based on a user's profile (Block 134). The requested information and any additional information included therewith is then formatted and delivered to the user in the preferred delivery medium (Block 140). Additionally, verification that the correct information was delivered to the requesting user may also be performed (Block 180). Verification operations may include verifying that all pages of a document are delivered, verifying that the information was delivered in the correct medium, and the like.

Figure 6D:
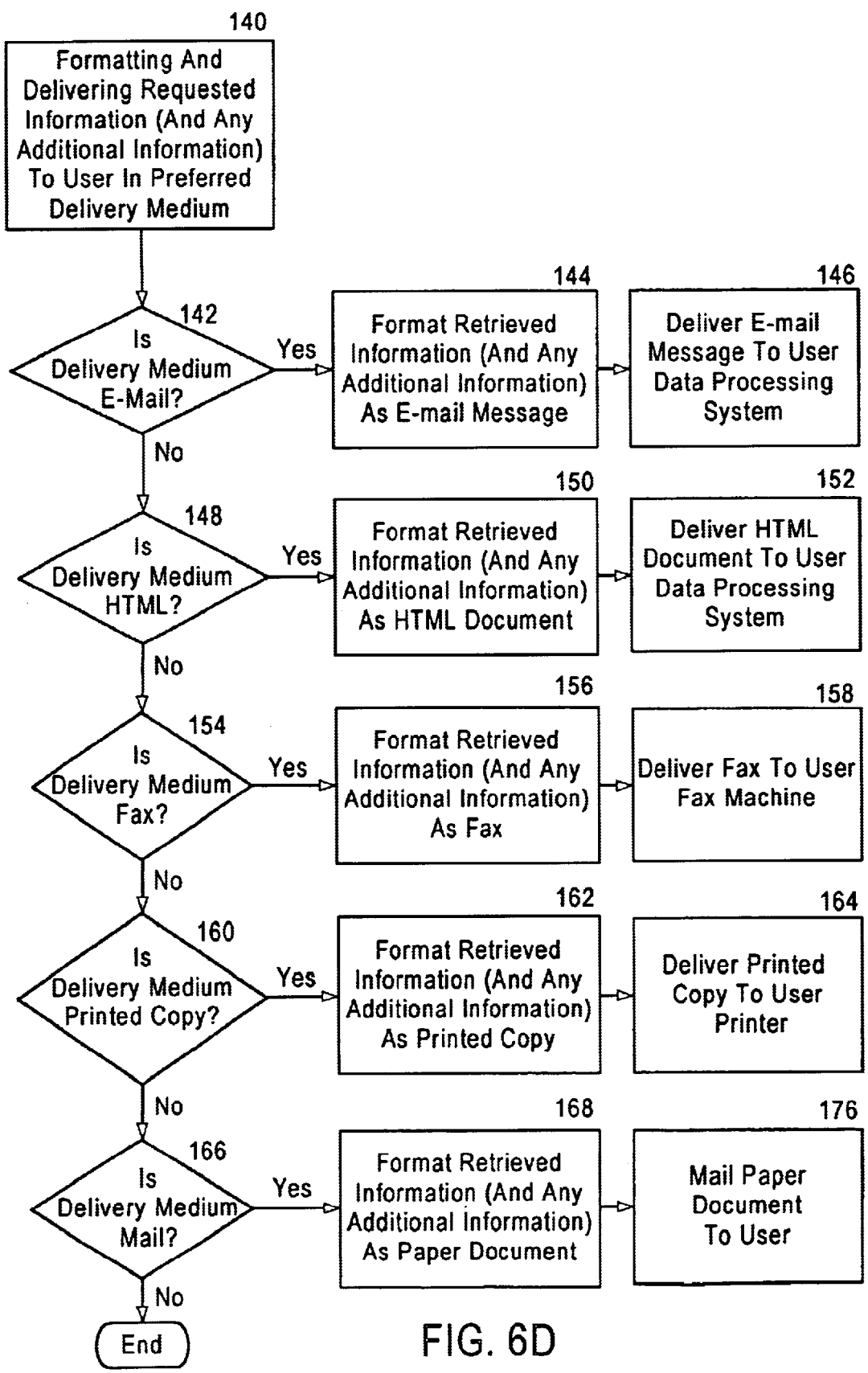

Referring now to FIG. 6D, operations for formatting and delivering requested information to a user in a preferred delivery medium (Block 140) are illustrated. If a determination is made that the delivery medium is to be e-mail (Block 142), the retrieved information, and any additional information, is formatted as an e-mail message (Block 144). The e-mail message is then delivered to a user's data processing system (Block 146). If a determination is made that the delivery medium is to be HTML (Block 148), the retrieved information, and any additional information, is formatted as an HTML document (Block 150). The HTML document is then delivered to a user's data processing system (Block 152).

If a determination is made that the delivery medium is to be fax (Block 154), the retrieved information, and any additional information, is formatted as a fax (Block 156). The fax is then delivered to a user's facsimile machine (Block 158). If a determination is made that the delivery medium is to be printed copy (Block 160), the retrieved information, and any additional information, is formatted as a printed copy (Block 162). The printed copy is then delivered to a user's printer (Block 164). If a determination is made that the delivery medium is to be mail (Block 166), the retrieved information, and any additional information, is formatted as a paper document (Block 168). The printed copy is then mailed to the user (Block 176).

In the Bank USA example, the Electronic Insertion Application provides additional information based on customer profile information in the database server. The retrieved information (and any additional information) is formatted via the Statement Distribution Application.

Figure 6E:
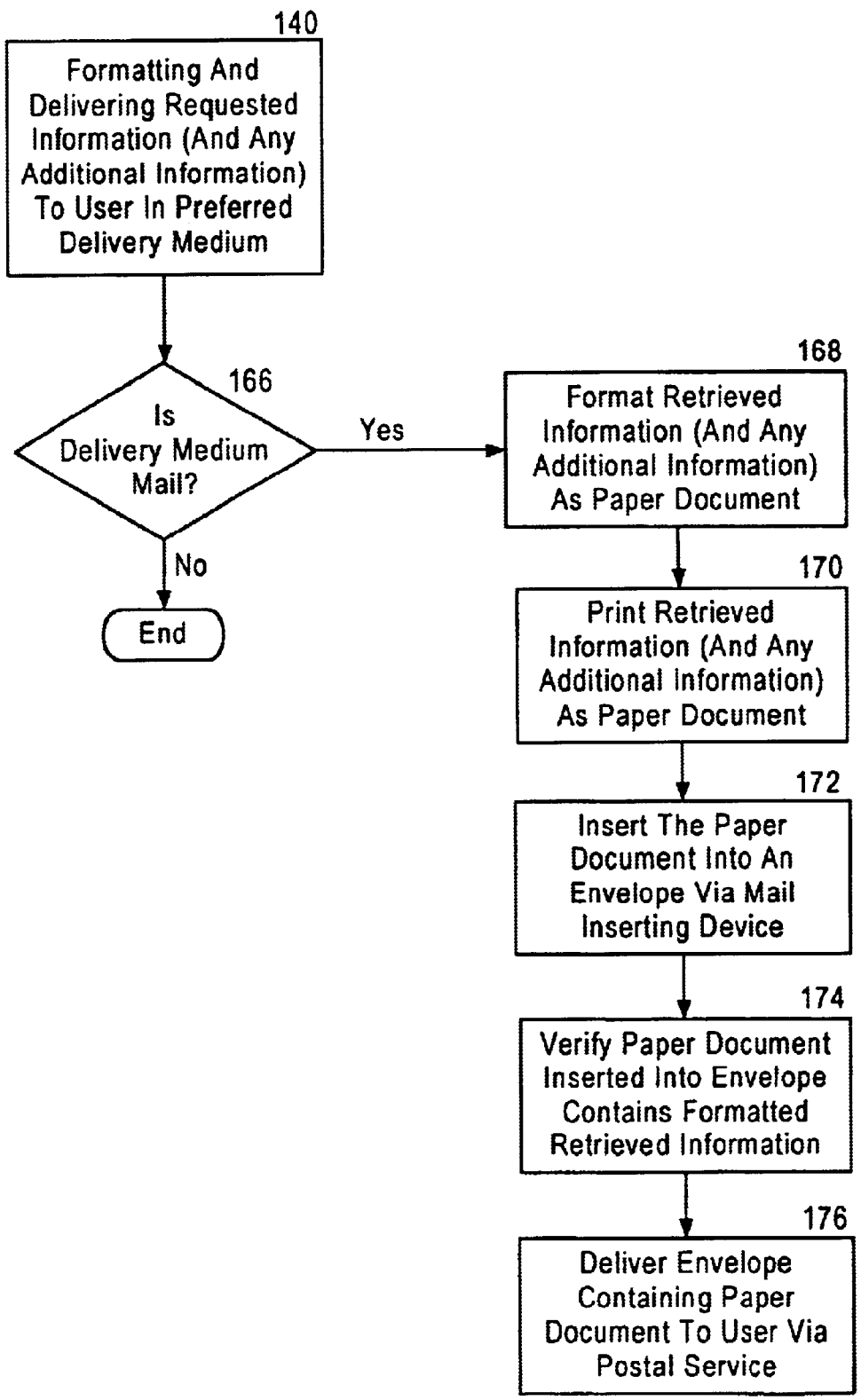

Referring now to FIG. 6E, operations for formatting and delivering requested information to a user, wherein mail is a preferred delivery medium, are illustrated. As described above, if a determination is made that the delivery medium is to be mail (Block 166), the retrieved information, and any additional information, is formatted as a paper document (Block 168). Operations involved in mailing the paper document to the user (Block 176) will now be described. Preferably, the paper document is inserted into an envelope via a mail inserting device (described in detail below) (Block 172). Operations for verifying that a paper document inserted into an envelope via a mail inserting device contains the retrieved information are then performed (Block 174). After verification operations are performed, the envelope containing the paper document inserted therein is forwarded to a postal service for delivery to the user (Block 176).

Mail Processing Systems

Mail processing systems include mail inserting systems, sorting systems, and a range of modular attachments for increasing the productivity of large scale mail production operations. Mail insertion systems include a device known as a mail inserter, which physically "stuffs" individual envelopes with the appropriate contents. Many businesses, such as financial institutions and public utilities, often produce voluminous mailings on a routine basis. As such, mailings are often performed at various locations to reduce the load on any given location and to be closer to the destination of the mailings.

In a conventional mail processing system, mail inserting machines (also referred to hereinafter as insertion machines or insertion devices) are utilized for stuffing inserts into awaiting envelopes. Thereafter, the stuffed envelopes are sealed and various other operations associated with mail processing are performed. Insertion machines typically operate at high speeds and can often stuff ten thousand (10,000) envelopes or more per hour. An exemplary insertion machine is described in Applicants' issued U.S. Pat. No. 4,798,040 to Haas et al., the disclosure of which is incorporated herein by reference in its entirety.

Referring now to FIG. 7, a schematic diagram of multiple mail insertion machines in communication with an alternative messaging system, is illustrated. Sites A and B each have one or more mail insertion machines 200 and are monitored and controlled via a Statement and Distribution Application (52, FIG. 3) operating on computer system 202. Computer system 202 includes a display 204 for visually displaying information to a computer user, a central processing unit (CPU) and internal memory. Keyboard 206 and mouse 208 allow the user to provide input to the central processing unit. Computer system 202, serves as data processing means for transmitting and receiving information from and to each mail insertion machine 200 and displaying same via display 204. Other computing systems, including mainframe computing systems, may be utilized in conjunction with a Statement Distribution Application of the present invention to facilitate communicating with the various mail processing devices being monitored and controlled.

Computer programs for controlling and monitoring the various mail processing devices may be stored in computer system 202, either within internal memory or on internal disk storage, or may also be stored on computer readable media and used therefrom by computer system 202. Preferably, computer system 202 monitors and controls the mail insertion devices in real time. An exemplary system for managing a plurality of mail processing devices is disclosed in U.S. Provisional Application No. 60/040,520 filed Mar. 14, 1997 by Applicant, the disclosure of which is incorporated herein by reference in its entirety. Computer programs for controlling and monitoring the various mail processing devices are compatible with, and may be integral with, a Statement Distribution Application of an alternative messaging system.

Mail-Piece Integrity

At its simplest level, mail-piece integrity involves ensuring that a customer receives the information he or she is intended to receive. For example, mail-piece integrity techniques utilized with respect to mail inserting machines ensure that the correct type and number of pages are inserted into each customer's envelope. Integrity verifications may also be performed at the feeder level wherein the inserted documents are scanned to determine whether they are the correct documents for this particular customer. Mail-piece integrity also relates to tracking a document to ensure that it reaches the end of the inserter. For example, if bank checks are to be inserted into envelopes, each envelope can be weighed to determine whether a bank check has been enclosed therewithin.

Mail-piece integrity is typically performed utilizing bar-code technology wherein a bar-code on a customer control document is compared with a bar-code printed in the customer address block. Mail-piece integrity may also be performed utilizing databases containing customer information. Whichever method is chosen, the present invention facilitates determining that every piece of information which was expected to do so reaches the customer, regardless of the delivery medium utilized.

Mail-piece integrity across all modes of communication, according to aspects of the present invention, includes, but is not limited to: who the mail-piece is to be delivered to; how the mail-piece is to be generated and delivered to the customer; what additional information, including format, is to be transmitted with mail-piece. A file for each customer may be generated and maintained utilizing existing information about the customer. When a mail-piece is delivered to a customer, the contents delivered to the customer are compared with the appropriate file.

In addition, the present invention is operative with Applicants' host-based Print Image Manipulation software (PRIME), which allows the handling of multiple output models including, but not limited to: financial data exchange protocols, HTML, and portable document format (PDF). Preferably, an output server to is utilized to distribute the documents through multiple channels. The output server may contain all information about what is being delivered and in what type of medium for a particular job. The output server receives verification from mail insertion devices and systems that a job has been completed. The output server also receives verification that electronic media has been received.

Encrypted Communications

All client/server communications between a customer and business in accordance with this invention are preferably encrypted using Secure Socket Layer (SSL) protocol (designed by Netscape Communications Corporation), or a similar encryption/security protocol. SSL is designed to prevent eavesdropping, tampering, and message forgery over the Internet. SSL is described in detail in the SSL 3.0 Specification, dated March 1996, which can be found at URL http://home.netscape.com/eng/ssl3/. It is especially preferred that communications involving financial and other sensitive information between a client and Web server be encrypted through SSL or a similar protocol.

One-On-One Marketing

The present invention allows businesses to utilize customer information to personalize communications with customers. For example, demographic data can be gathered and this data can be used to provide customers with information of interest to him or her. The present invention is advantageous because it can tailor and produce personalized messages and advertising in different delivery medium simultaneously for individual consumers. Furthermore, the present invention allows customers to select the various methods of communication, such as e-mail, Web or paper-based mail.

The present invention is designed to increase the efficiency and effectiveness of marketing by facilitating the development of relationships between individual consumers and the sellers of goods and services. Traditionally, sellers have utilized techniques such as mail merge and segmentation marketing to increase the effectiveness of mass media communications. However, these techniques typically produce a lower return on investment than can be achieved using direct one-on-one marketing. The present invention increases the return on investment of mass media communications by tailoring content in a manner that is more personable to consumers and by facilitating interactivity with consumers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for delivering information to a user comprising the following steps that are performed by a data processing system:

storing a user profile indicating a preferred delivery medium for delivering information to the user;

in response to a request for information, retrieving the requested information;

formatting the retrieved information for delivery in the preferred delivery medium indicated in the stored user profile, wherein the user preferred delivery medium is determined from the stored user profile independent of a format associated with the request; and delivering the formatted information to the user in the preferred delivery medium.

2. A method according to claim 1 further comprising the following steps:

responsive to an indication that the user did not receive the information via the preferred delivery medium indicated in the stored user profile, formatting the retrieved information for delivery in an alternative delivery medium different from the preferred delivery medium wherein the alternative delivery medium is indicated within the stored user profile; and delivering the information formatted for delivery via the alternative delivery medium to the user in the alternative delivery medium.

3. A method according to claim 2 wherein the step of formatting the retrieved information for delivery in an alternative delivery medium indicated in the stored user profile comprises formatting the retrieved information as a printed document, and wherein the step of delivering the information comprises delivering the printed document from the data processing system to a user printer in communication with the data processing system.

4. A method according to claim 2 wherein the step of formatting the retrieved information for delivery in an alternative delivery medium indicated in the stored user profile comprises formatting the retrieved information as a paper document, and wherein the step of delivering the information comprises the steps of:

inserting the paper document into an envelope via a mail inserting device; and delivering the envelope containing the paper document to the user via a postal service.

5. A method according to claim 2 wherein the step of formatting the retrieved information for delivery in an alternative delivery medium comprises formatting the retrieved information as a printed document, and wherein the step of delivering the information comprises delivering the printed document from the data processing system to a user printer in communication with the data processing system.

6. A method according to claim 2 wherein the step of formatting the retrieved information for delivery in an alternative delivery medium comprises formatting the retrieved information as a paper document, and wherein the step of delivering the information comprises the steps of:

inserting the paper document into an envelope via a mail inserting device; and delivering the envelope containing the paper document to the user via a postal service.

7. A method according to claim 2 further comprising the step of including additional, non-requested information with the requested information in the preferred delivery medium, and wherein the additional information is selected based on information contained within the user profile.

8. A method according to claim 2 further comprising the step of including additional, non-requested information with the requested information in the alternative delivery medium, and wherein the additional information is selected based on information contained within the user profile.

9. A method according to claim 1 further comprising the steps of:

if the preferred delivery medium indicated in the stored user profile utilizes a format of e-mail, formatting the retrieved information as an e-mail message; and delivering the e-mail message from the data processing system to a user data processing system in communication with the data processing system.

10. A method according to claim 1 further comprising the steps of:

if the preferred delivery medium indicated in the stored user profile utilizes a format of HTML, formatting the retrieved information as an HTML document; and delivering the HTML document from the data processing system to a user data processing system in communication with the data processing system.

11. A method according to claim 1 further comprising the steps of:

if the preferred delivery medium indicated in the stored user profile utilizes a format of fax, formatting the retrieved information as a fax document; and delivering the fax document from the data processing system to a user facsimile machine in communication with the data processing system.

12. A method according to claim 1 wherein the request for information is initiated by the user.

13. A method according to claim 1 wherein the request for information is a non-user request.

14. A method for delivering information to a user comprising the following steps that are performed by a data processing system:

storing a user profile indicating an electronic delivery medium as a preferred delivery medium for delivering information to the user;

in response to a request for information, retrieving the requested information;

formatting the retrieved information for delivery in the electronic delivery medium indicated in the stored user profile, wherein the user preferred delivery medium is determined from the stored user profile independent of a format associated with the request;

delivering the formatted information to the user in the electronic delivery medium;

responsive to an indication that the user did not receive the information via the electronic delivery medium, formatting the retrieved information for delivery in a printed delivery medium comprising formatting the retrieved information as a paper document;

inserting the paper document into an envelope via a mail inserting device; and delivering the envelope containing the paper document to the user via a postal service.

15. A method according to claim 14 further comprising the steps of:

if the preferred delivery medium utilizes a format of e-mail, formatting the retrieved information as an e-mail message; and delivering the e-mail message from the data processing system to a user data processing system in communication with the data processing system.

16. A method according to claim 14 further comprising the steps of:

if the preferred delivery medium utilizes a format of HTML, formatting the retrieved information as an HTML document; and delivering the HTML document from the data processing system to a user data processing system in communication with the data processing system.

17. A method according to claim 14 further comprising the steps of:

if the preferred delivery medium is utilizes a format of fax, formatting the retrieved information as a fax document; and delivering the fax document from the data processing system to a user facsimile machine in communication with the data processing system.

18. A method according to claim 14 wherein the request for information is initiated by the user.

19. A method according to claim 14 wherein the request for information is a non-user request.

20. A data processing system for delivering information to a user, comprising:

means for storing a user profile indicating a preferred delivery medium for delivering information to the user;

means for retrieving information in response to a request;

means for formatting the retrieved information for delivery in the preferred delivery medium indicated in the stored user profile, wherein the user preferred delivery medium is determined from the stored user profile independent of a format associated with the request;

means for delivering the formatted information to the user in the preferred delivery medium;

means for formatting the retrieved information for delivery in an alternative delivery medium different from the preferred delivery medium in response to an indication that the user did not receive the information via the preferred delivery medium wherein the alternative delivery medium is indicated within the stored user profile; and means for delivering the information formatted for delivery via the alternative delivery medium to the user in the alternative delivery medium.

21. A data processing system according to claim 20 further comprising:

means for formatting the retrieved information as an e-mail message if the preferred or alternative delivery medium utilizes a format of e-mail; and means for delivering the e-mail message from the data processing system to a user data processing system in communication with the data processing system.

22. A data processing system according to claim 20 further comprising:

means for formatting the retrieved information as an HTML document if the preferred or alternative delivery medium utilizes a format of HTML; and means for delivering the HTML document from the data processing system to a user data processing system in communication with the data processing system.

23. A data processing system according to claim 20 further comprising:

means for formatting the retrieved information as a fax document if the preferred or alternative delivery medium utilizes a format of fax; and means for delivering the fax document from the data processing system to a user facsimile machine in communication with the data processing system.

24. A data processing system according to claim 20 wherein the means for formatting the retrieved information for delivery in an alternative delivery medium comprises means for formatting the retrieved information as a printed document, and wherein the means for delivering the information formatted for delivery in an alternative delivery medium comprises means for delivering the printed document from the data processing system to a user printer in communication with the data processing system.

25. A data processing system according to claim 20 wherein the means for formatting the retrieved information for delivery in an alternative delivery medium comprises means for formatting the retrieved information as a paper document, and wherein the means for delivering the information in an alternative delivery medium comprises:

means for inserting the paper document into an envelope via a mail inserting device; and means for delivering the envelope containing the paper document to the user via a postal service.

26. A data processing system according to claim 20 further comprising means for including additional, non-requested information with the requested information in the preferred delivery medium, and wherein the additional information is selected based on information contained within the user profile.

27. A data processing system according to claim 20 further comprising means for including additional, non-requested information with the requested information in the alternative delivery medium, and wherein the additional information is selected based on information contained within the user profile.

28. A data processing system according to claim 20 wherein the request for information is initiated by the user.

29. A data processing system according to claim 20 wherein the request for information is a non-user request.

30. A computer program product for delivering information to a user, the computer program product comprising a computer usable storage medium having computer readable program code means embodied in the medium, the computer readable program code means comprising:

computer readable program code means for storing a user profile indicating a preferred delivery medium for delivering information to the user;

computer readable program code means for retrieving information in response to a request;

computer readable program code means for formatting the retrieved information for delivery in the preferred delivery medium indicated in the stored user profile, wherein the user preferred delivery medium is determined from the stored user profile independent of a format associated with the request;

computer readable program code means for delivering the formatted information to the user in the preferred delivery medium;

computer readable program code means for formatting the retrieved information for delivery in an alternative delivery medium different from the preferred delivery medium in response to an indication that the user did not receive the information via the preferred delivery medium wherein the alternative delivery medium is indicated within the stored user profile; and computer readable program code means for delivering the information formatted for delivery via the alternative delivery medium to the user in the alternative delivery medium.

31. A computer program product according to claim 30 further comprising:

computer readable program code means for formatting the retrieved information as an e-mail message if the preferred or alternative delivery medium utilizes a format of e-mail; and computer readable program code means for delivering the e-mail message from the data processing system to a user data processing system in communication with the data processing system.

32. A computer program product according to claim 30 further comprising:

computer readable program code means for formatting the retrieved information as an HTML document if the preferred or alternative delivery medium utilizes a format of HTML; and computer readable program code means for delivering the HTML document from the data processing system to a user data processing system in communication with the data processing system.

33. A computer program product according to claim 30 further comprising:

computer readable program code means for formatting the retrieved information as a fax document if the preferred or alternative delivery medium utilizes a format of fax; and computer readable program code for delivering the fax document from the data processing system to a user facsimile machine in communication with the data processing system.

34. A computer program product according to claim 30 wherein the computer readable program code means for formatting the retrieved information for delivery in an alternative delivery medium comprises computer readable program code means for formatting the retrieved information as a printed document, and wherein the computer readable program code means for delivering the information formatted for delivery in an alternative delivery medium comprises a computer readable program code means for delivering the printed document from the data processing system to a user printer in communication with the data processing system.

35. A computer program product according to claim 30 further comprising computer readable program code means for including additional, non-requested information with the requested information in the preferred delivery medium, and wherein the additional information is selected based on information contained with the user profile.

36. A computer program product according to claim 30 further comprising computer readable program code means for including additional, non-requested information with the requested information in the alternative delivery medium, and wherein the additional information is selected based on information contained within the user profile.

37. A method for delivering information to a user comprising the following steps that are performed by a data processing system:
    storing a user profile indicating a preferred delivery medium for delivering information to the user;
    in response to a request for information, retrieving the requested information;
    formatting the retrieved information for delivery in the preferred delivery medium indicated in the stored user profile, wherein the user preferred delivery medium is determined from the stored user profile independent of a format associated with the request;
    delivering the formatted information to the user in the preferred delivery medium;
    comparing said delivered formatted information with said requested information;
    informing said data processing system of the results of said comparison; and
    re-delivering said requested information to the user if said step of informing comprises informing said data processing system that said delivered and requested information were different.

38. A computer program product according to claim 30 wherein the request for information is a non-user request.

39. A computer program product according to claim 30 wherein the request for information is initiated by the user.

40. A method according to claim 39, wherein said step of re-delivering further comprises:
    formatting the retrieved information for delivery in an alternative delivery medium different from the preferred delivery medium wherein the alternative delivery medium is indicated within the stored user profile; and
    delivering the information formatted for delivery via the alternative delivery medium to the user in the alternative delivery medium.

41. A method according to claim 39, wherein said step of comparing includes comparing the actual recipient of said delivered information with the user requesting said information.

42. A method according to claim 39 wherein the request for information is initiated by the user.

43. A method according to claim 39 wherein the request for information is a non-user request.

44. A method for delivering information to a user comprising the following steps that are performed by a data processing system:
    storing a user profile indicating a preferred delivery medium for delivering information to the user;
    in response to a request for information, retrieving the requested information;
    formatting the retrieved information for delivery in the preferred delivery medium indicated in the stored user profile wherein the user preferred delivery medium is determined from the stored user profile independent of a format associated with the request;
    delivering the formatted information to the user in the preferred delivery medium; and
    said delivered information having consistent presentation regardless of said preferred delivery medium.

45. A method according to claim 44, wherein the step of retrieving the requested information includes the step of providing advertising data for formatting and delivering with said requested information.

46. A method according to claim 45, wherein said step of providing advertising data further comprises providing advertising data based upon said user profile.

47. A method according to claim 46, wherein said steps of formatting and delivering said advertising materials is conducted according to said user profile and may be different from said preferred delivery medium.

48. A method according to claim 44 wherein the request for information is initiated by the user.

49. A method according to claim 44 wherein the request for information is a non-user request.

50. A method for delivering information to a user comprising the following steps that are performed by a data processing system:
    storing a user profile indicating a preferred delivery medium for delivering information to the user;
    in response to a request for information, retrieving the requested information;
    formatting the retrieved information for delivery in the preferred delivery medium indicated in the stored user profile, wherein the user preferred delivery medium is determined from the stored user profile independent of a format associated with the request;
    delivering the formatted information to the user in the preferred delivery medium;
    in response to an indication that the user did not receive the information via the preferred delivery medium indicated in the stored user profile, formatting the retrieved information for delivery in an alternative delivery medium different from the preferred delivery medium, wherein the alternative delivery medium is indicated within the stored user profile; and
    delivering the information formatted for delivery via the alternative delivery medium to the user in the alternative delivery medium.

51. A computer program product comprising:
    at least one computer readable medium;
    a database carried on the at least one computer readable medium, the database configured for storing profiles of a plurality of users, each profile for a respective user indicating a delivery medium preferred by the respective user; and
    executable program code carried on the at least one computer readable medium, wherein execution of the program code by a computer causes the computer to perform the following sequence of steps:
    in response to a request, retrieving requested information for an identified one of the users from storage and locating the profile of the one user in the database;
    determining a preferred delivery medium from the profile of the one user, independent of a format associated with the request;

formatting the retrieved information for the preferred delivery medium determined from the profile of the one user; and sending the formatted information via the preferred delivery medium.

52. A data processing system for delivering information to a user, comprising:

a database containing a stored user profile indicating a preferred delivery medium for delivering information to the user;

a server operable for retrieving information in response to a request, the server also being operable for formatting the retrieved information for delivery in the preferred delivery medium indicated in the stored user profile, wherein the user preferred delivery medium is determined from the stored user profile independent of a format associated with the request; and a delivery medium operable for delivering the formatted information to the user in the preferred delivery medium.

53. A data processing system according to claim 52, wherein the server is operable for formatting the retrieved information for delivery in an alternative delivery medium different from the preferred delivery medium in response to an indication that the user did not receive the information via the preferred delivery medium indicated in the stored user profile, wherein the alternative delivery medium is indicated within the stored user profile; and comprising an alternative delivery medium operable for delivering the information formatted for delivery via the alternative delivery medium to the user.

54. A data processing system according to claim 53, wherein the server is operable for formatting the retrieved information as a printed document in response to an indication that the user did not receive the information via the preferred delivery medium indicated in the stored user profile, and wherein the alternative delivery media is operable for initiating delivery of the printed document from the data processing system to a user printer in communication with the data processing system.

55. A data processing system according to claim 53, wherein the server is operable for formatting the retrieved information as a paper document in response to an indication that the user did not receive the information via the preferred delivery medium indicated in the stored user profile, and wherein the data processing system further comprises a mail inserting device operable for inserting the paper document into an envelope for delivering the envelope containing the paper document to the user via a postal service.

56. A data processing system according to claim 53 wherein the server is operable for formatting the retrieved information as a printed document in response to an indication that the user did not receive the information via the preferred delivery medium indicated in the stored user profile, and wherein the alternative delivery medium is operable for delivering the printed document to a user printer in communication with the data processing system.

57. A data processing system according to claim 53, wherein the server is further operable for including additional, non-requested information with the requested information in the preferred delivery medium, and wherein the additional information is selected based on information contained within the user profile.

58. A data processing system according to claim 53, wherein the server is further operable for including additional, non-requested information with the requested information in the alternative delivery medium, and wherein the additional information is selected based on information contained within the user profile.

59. A data processing system according to claim 52, wherein the server is operable for formatting the retrieved information as an e-mail message if the preferred delivery medium indicated in the stored user profile utilizes a format of e-mail; and wherein the delivery medium is operable for delivering the e-mail message from the data processing system to a user data processing system in communication with the data processing system.

60. A data processing system according to claim 52, wherein the server is operable for formatting the retrieved information as an HTML document if the preferred delivery medium indicated in the stored user profile utilizes a format of HTML; and wherein the delivery medium is operable for delivering the HTML document from the data processing system to a user data processing system in communication with the data processing system.

61. A data processing system according to claim 52 wherein the server is operable for formatting the retrieved information as a fax document if the preferred delivery medium indicated in the stored user profile utilizes a format of fax; and wherein the delivery media is operable for delivering the fax document from the data processing system to a user facsimile machine in communication with the data processing system.

* * * * *